United States Patent
Kim et al.

(10) Patent No.: US 10,893,535 B2
(45) Date of Patent: Jan. 12, 2021

(54) METHOD FOR TRANSMITTING AND RECEIVING UPLINK SIGNAL BETWEEN TERMINAL AND BASE STATION IN WIRELESS COMMUNICATION SYSTEM FOR SUPPORTING UNLICENSED BAND, AND APPARATUS FOR SUPPORTING SAME

(71) Applicant: LG ELECTRONICS INC., Seoul (KR)

(72) Inventors: Seonwook Kim, Seoul (KR); Hanjun Park, Seoul (KR); Changhwan Park, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/730,942

(22) Filed: Dec. 30, 2019

(65) Prior Publication Data

US 2020/0137780 A1 Apr. 30, 2020

Related U.S. Application Data

(63) Continuation of application No. PCT/KR2019/001825, filed on Feb. 14, 2019.

(30) Foreign Application Priority Data

Apr. 6, 2018 (KR) .................. 10-2018-0040068
Sep. 25, 2018 (KR) .................. 10-2018-0114553

(51) Int. Cl.
*H04W 72/12* (2009.01)
*H04L 1/00* (2006.01)
(Continued)

(52) U.S. Cl.
CPC ....... *H04W 72/1268* (2013.01); *H04L 1/0068* (2013.01); *H04L 5/0051* (2013.01);
(Continued)

(58) Field of Classification Search
CPC . H04L 1/00; H04L 1/0068; H04L 1/16; H04L 5/00; H04L 5/0051; H04L 5/0082;
(Continued)

(56) References Cited

U.S. PATENT DOCUMENTS

2017/0215206 A1* 7/2017 Cheng ................... H04W 16/14
2018/0124790 A1* 5/2018 Yerramalli ............ H04W 16/14
(Continued)

FOREIGN PATENT DOCUMENTS

| WO | 2017118687 | 7/2017 |
|----|------------|--------|
| WO | 2017131458 | 8/2017 |
| WO | 2017171325 | 10/2017 |

OTHER PUBLICATIONS

Svensson, T., Frank, T., Eriksson, T. et al. Block Interleaved Frequency Division Multiple Access for Power Efficiency, Robustness, Flexibility, and Scalability. J Wireless Com Network 2009, 720973 (2009). https://doi.org/10.1155/2009/720973 (Year: 2009).*
(Continued)

*Primary Examiner* — Kashif Siddiqui
(74) *Attorney, Agent, or Firm* — Lee, Hong, Degerman, Kang & Waimey

(57) ABSTRACT

Disclosed are a method for transmitting and receiving an uplink signal between a terminal and a base station in a wireless communication system for supporting an unlicensed band, and an apparatus for supporting same. More particularly, the present invention includes a structure of interlace(s) scheduled for transmitting and receiving an uplink signal in an unlicensed band, and one embodiment in
(Continued)

which the uplink signal is transmitted and received in the unlicensed band on the basis of same.

17 Claims, 31 Drawing Sheets

Related U.S. Application Data

(60) Provisional application No. 62/630,261, filed on Feb. 14, 2018, provisional application No. 62/669,977, filed on May 10, 2018, provisional application No. 62/674,014, filed on May 20, 2018.

(51) Int. Cl.
| | |
|---|---|
| *H04L 5/00* | (2006.01) |
| *H04L 5/10* | (2006.01) |
| *H04W 16/14* | (2009.01) |
| *H04W 72/04* | (2009.01) |
| *H04W 80/08* | (2009.01) |

(52) U.S. Cl.
CPC .......... *H04L 5/0082* (2013.01); *H04L 5/0094* (2013.01); *H04L 5/10* (2013.01); *H04W 16/14* (2013.01); *H04W 72/0413* (2013.01); *H04W 72/0446* (2013.01); *H04W 72/0453* (2013.01); *H04W 80/08* (2013.01)

(58) Field of Classification Search
CPC ........ H04L 5/0094; H04L 5/10; H04W 16/14; H04W 72/04; H04W 72/0413; H04W 72/0446; H04W 72/0453; H04W 72/1268; H04W 74/08; H04W 80/08
See application file for complete search history.

(56) References Cited

U.S. PATENT DOCUMENTS

| | | | | |
|---|---|---|---|---|
| 2018/0131493 A1* | 5/2018 | Luo | ....................... | H04L 5/0007 |
| 2018/0192417 A1* | 7/2018 | Yin | ....................... | H04L 1/1812 |
| 2018/0220415 A1* | 8/2018 | Yin | ....................... | H04L 5/0012 |
| 2019/0150182 A1* | 5/2019 | Koorapaty | ............ | H04L 5/0041 |
| | | | | 370/329 |
| 2019/0158334 A1* | 5/2019 | Kim | ..................... | H04L 27/2666 |
| 2019/0190668 A1* | 6/2019 | Lei | .......................... | H04L 5/001 |
| 2019/0342874 A1* | 11/2019 | Davydov | ........... | H04W 72/0413 |
| 2019/0356446 A1* | 11/2019 | Kim | ....................... | H04L 5/0051 |
| 2020/0015223 A1* | 1/2020 | Matsumura | ........... | H04L 5/0051 |
| 2020/0119894 A1* | 4/2020 | Jia | .......................... | H04L 5/0094 |

OTHER PUBLICATIONS

T. Svensson, T. Frank, D. Falconer, M. Sternad, E. Costa and A. Klein, "B-IFDMA—A Power Efficient Multiple Access Scheme for Non-frequency-adaptive Transmission," 2007 16th IST Mobile and Wireless Communications Summit, Budapest, 2007, pp. 1-5, doi: 10.1109/ISTMWC.2007.4299251. (Year: 2007).*
Qualcomm, "Potential solutions and techniques for NR unlicensed", 3GPP TSG RAN WG1 Meeting #92, R1-1802865, Mar. 2018, 11 pages.
PCT International Application No. PCT/KR2019/001825, Notification of Transmittal of the International Search Report and the Written Opinion of the International Searching Authority, or Declaration dated May 29, 2019, 10 pages.
Interdigital, "General views on NR Operation in Unlicensed Spectrum", 3GPP TSG RAN WG1 Meeting AH 1801, R1-1800637, Jan. 2018, 7 pages.
ZTE, "Further consideration on PRB placement", 3GPP TSG RAN WG4 Meeting #85, R4-1713262, Dec. 2017, 7 pages.
Huawei, et al., "NR Numerology on unlicensed bands", 3GPP TSG RAN WG1 Adhoc Meeting, R1-1800039, Jan. 2018, 6 pages.
NEC, "Waveform and numerology consideration on NR unlicensed band", 3GPP TSG RAN WG1 Meeting AH 1801, R1-1800221, Jan. 2018, 3 pages.
Qualcomm, "PUSCH design details for eLAA", 3GPP TSG RAN WG1 Meeting #85, R1-164406, May 2016, 4 pages.
LG Electronics, "Random access preamble in LAA", 3GPP TSG RAN WG1 Meeting #85, R1-164500, May 2016, 5 pages.
Qualcomm, "On UL resource allocation for 10MHz eLAA", 3GPP TSG RAN WG1 Meeting #86bis, R1-1609944, Oct. 2016, 2 pages.
European Patent Office Application Serial No. 19755094.0, Search Report dated Jul. 23, 2020, 13 pages.
NEC, "Remaining issues on PUSCH resource allocation", R1-164479, 3GPP TSG RAN WG1 Meeting #85, May 2016, 4 pages.

\* cited by examiner

FIG. 18

| Configuration type 1<br>CDM-T & CDM-F | Configuration type 2<br>CDM-T & CDM-F |
|---|---|
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |
| P2/P3/P6/P7 | P4/P5/P10/P11 |
| P0/P1/P4/P5 | P4/P5/P10/P11 |
| P2/P3/P6/P7 | P2/P3/P8/P9 |
| P0/P1/P4/P5 | P2/P3/P8/P9 |
| P2/P3/P6/P7 | P0/P1/P6/P7 |
| P0/P1/P4/P5 | P0/P1/P6/P7 |

(a)

(b)

(a) Carrier aggregation between L-band and U-band (b) Standalone U-band(s)

(a)

(b)

METHOD FOR TRANSMITTING AND RECEIVING UPLINK SIGNAL BETWEEN TERMINAL AND BASE STATION IN WIRELESS COMMUNICATION SYSTEM FOR SUPPORTING UNLICENSED BAND, AND APPARATUS FOR SUPPORTING SAME

CROSS-REFERENCE TO RELATED APPLICATIONS

This application is a continuation of International Application No. PCT/KR2019/001825, filed on Feb. 14, 2019, which claims the benefit of U.S. Provisional Application Nos. 62/630,261, filed Feb. 14, 2018, 62/669,977, filed on May 10, 2018, and 62/674,014, filed on May 10, 2018, and also claims the benefit of earlier filing date and right of priority to Korean Patent Application Nos. 10-2018-0040068, filed on Apr. 6, 2018, and 10-2018-0114553, filed on Sep. 25, 2018, the contents of which are all hereby incorporated by reference herein in their entireties.

TECHNICAL FIELD

The present disclosure relates to a wireless communication system, and more particularly, to a method and apparatus for transmitting and receiving an uplink signal between a terminal and a base station (BS) in a wireless communication system supporting an unlicensed band.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

An aspect of the present disclosure devised to solve the conventional problem is to provide a method and apparatus for transmitting and receiving an uplink signal between a terminal and a base station (BS) in a wireless communication system supporting an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving an uplink signal between a terminal and a base station (BS) in a wireless communication system supporting an unlicensed band.

In an aspect of the present disclosure, a method of transmitting an uplink signal by a user equipment (UE) in a wireless communication system supporting an unlicensed band includes mapping the uplink signal to at least one interlace among a plurality of interlaces, and transmitting the uplink signal via the at least one interlace in the unlicensed band. One interlace among the plurality of interlaces is composed of N resource blocks (RBs) having an identical RB interval between adjacent RBs in a unit of a first frequency bandwidth. A number M of interlaces included in the unit of the first frequency bandwidth and a number N of RBs included in the one interlace are determined based on a configured subcarrier spacing. M and N are natural numbers.

For example, when the configured subcarrier spacing is 15 kHz, M may be determined to be 10, and N may be determined to be 10 or 11.

In another example, when the configured subcarrier spacing is 30 kHz, M may be determined to be 5, and N may be determined to be 10 or 11.

In the present disclosure, the unit of the first frequency bandwidth may be 20 MHz.

When a total frequency allocated to the UE is larger than 20 MHz, the plurality of interlaces may be configured as a set of M interlaces configured every 20 MHz.

In the present disclosure, the subcarrier spacing may be configured by higher-layer signaling.

In the present disclosure, the uplink signal may include a physical uplink shared channel (PUSCH) signal or a physical uplink control channel (PUCCH) signal.

The UE may transmit the uplink signal in the at least one interlace in the unlicensed band by using a channel access procedure (CAP).

Particularly, the uplink signal may be transmitted by puncturing one or more symbols of the uplink signal based on the CAP.

When the PUCCH signal out of the uplink signal is punctured based on the CAP, the PUCCH signal may be transmitted in a remaining uplink signal.

Alternatively, the uplink signal may be transmitted after one or more symbols from a scheduled timing.

In the present disclosure, the PUCCH signal may be transmitted across 1 or 2 symbols or across 4 to 14 symbols, based on a configured PUCCH format.

In the present disclosure, the PUCCH signal may be transmitted including the same uplink control information (UCI) in each RB included in the at least one interlace.

In the present disclosure, the PUCCH signal may be transmitted including different UCI in each RB included in the at least one interlace.

In the present disclosure, one RB may include 12 subcarriers in a frequency domain.

In another aspect of the present disclosure, a communication device for transmitting an uplink signal to a base station (BS) in a wireless communication system supporting an unlicensed band includes a memory and a processor operatively coupled to the memory. The processor is configured to map the uplink signal to at least one interlace among a plurality of interlaces, and transmit the uplink signal via the at least one interlace in the unlicensed band. One interlace among the plurality of interlaces is composed of N RBs having an identical RB interval between adjacent RBs in a unit of a first frequency bandwidth. A number M of interlaces included in the unit of the first frequency bandwidth and a number N of RBs included in the one interlace are determined based on a configured subcarrier spacing. M and N are natural numbers.

In another aspect of the present disclosure, a communication device for receiving an uplink signal from a UE in a wireless communication system supporting an unlicensed band includes a memory and a processor operatively coupled to the memory. The processor is configured to receive the uplink signal in at least one interlace among a plurality of interlaces. One interlace among the plurality of interlaces is composed of N RBs having an identical RB interval between adjacent RBs in a unit of a first frequency bandwidth. A number M of interlaces included in the unit of the first frequency bandwidth and a number N of RBs included in the one interlace are determined based on a configured subcarrier spacing. M and N are natural numbers.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, interlace resources (or an interlace structure, an interlace configuration, or the like) carrying an uplink signal in an unlicensed band may vary according to configured subcarrier spacings or numerologies.

Further, interlace resources are configured in units of a predetermined frequency unit (e.g., 20 MHz). Therefore, a user equipment (UE) to which a frequency (e.g., 100 MHz) larger than the predetermined frequency band may transmit an uplink signal in an unlicensed bane, using a plurality of interlace resources (e.g., interlace structures, interlace configurations, or the like) configured in units of the predetermined frequency unit. That is, the complexity of a base station (BS) and the UE for uplink signal transmission and reception in the unlicensed band may be decreased.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present invention together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 18 is a schematic diagram illustrating two demodulation reference signal (DMRS) configuration types applicable to the present disclosure.

BEST MODE FOR CARRYING OUT THE INVENTION

Figure 1:
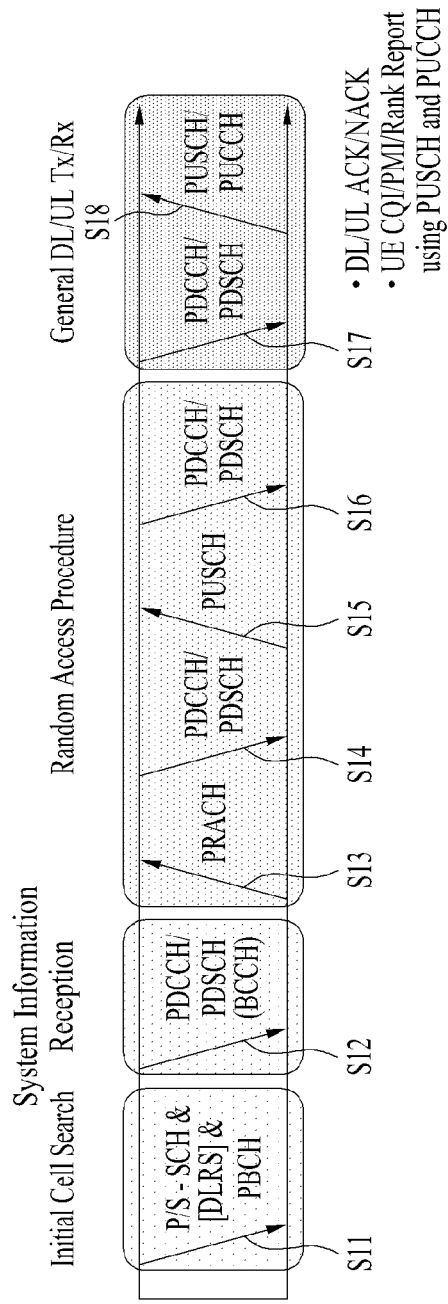
FIG. 1 is a diagram illustrating physical channels and a signal transmission method using the physical channels according to embodiments of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
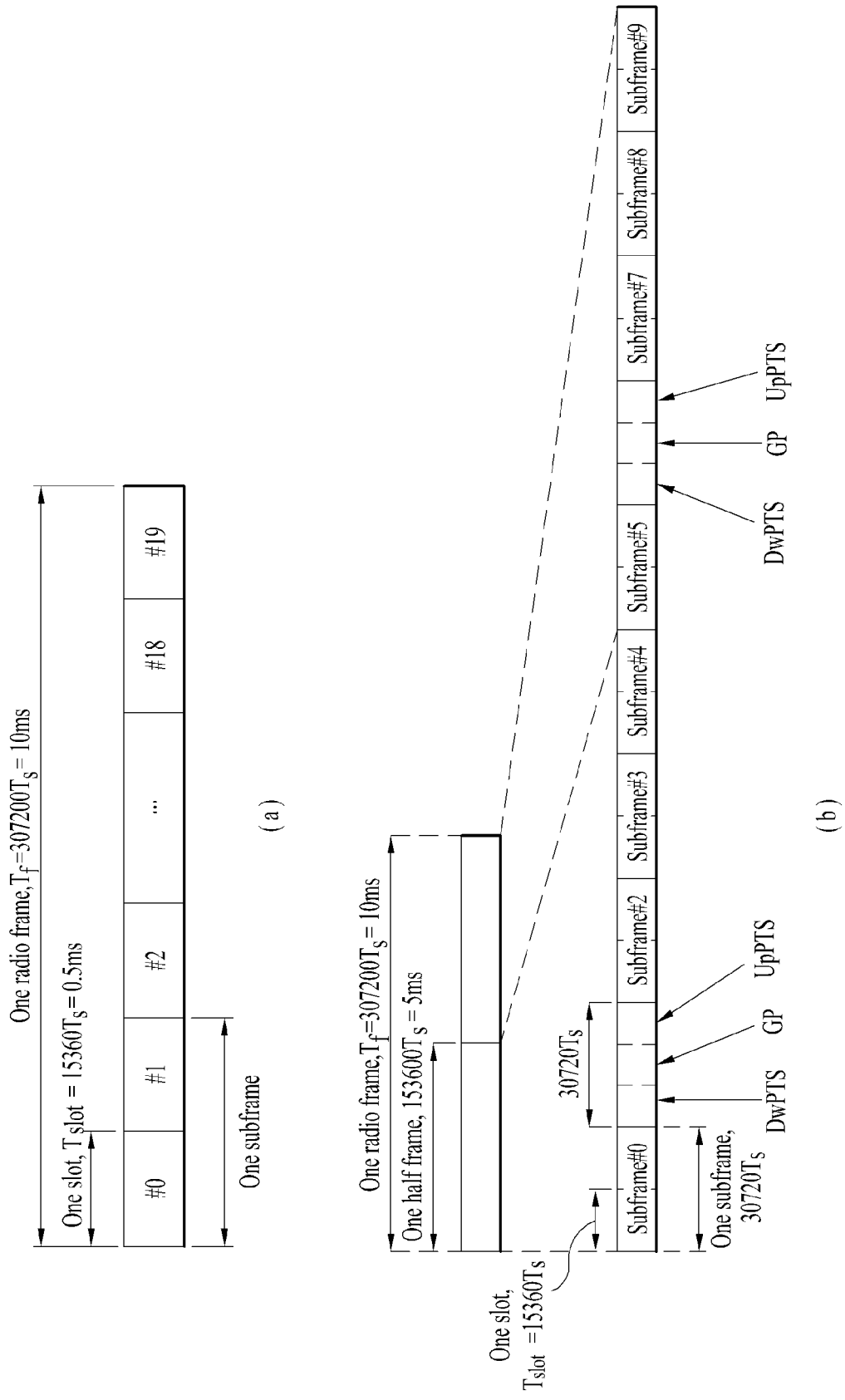
FIGS. 2 and 3 are diagrams illustrating radio frame structures in a long term evolution (LTE) system to which embodiments of the present disclosure are applicable.
Figure 3:
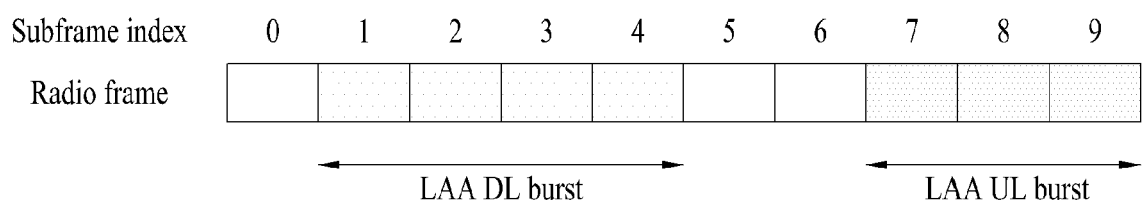

FIGS. 2 and 3 are diagrams illustrating radio frame structures in an LTE system to which embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1, | 2, 3, 4 | 5, 6 | 0, 1 | 2, 3 | 4, 5, 6 |

FIG. 2(b) illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
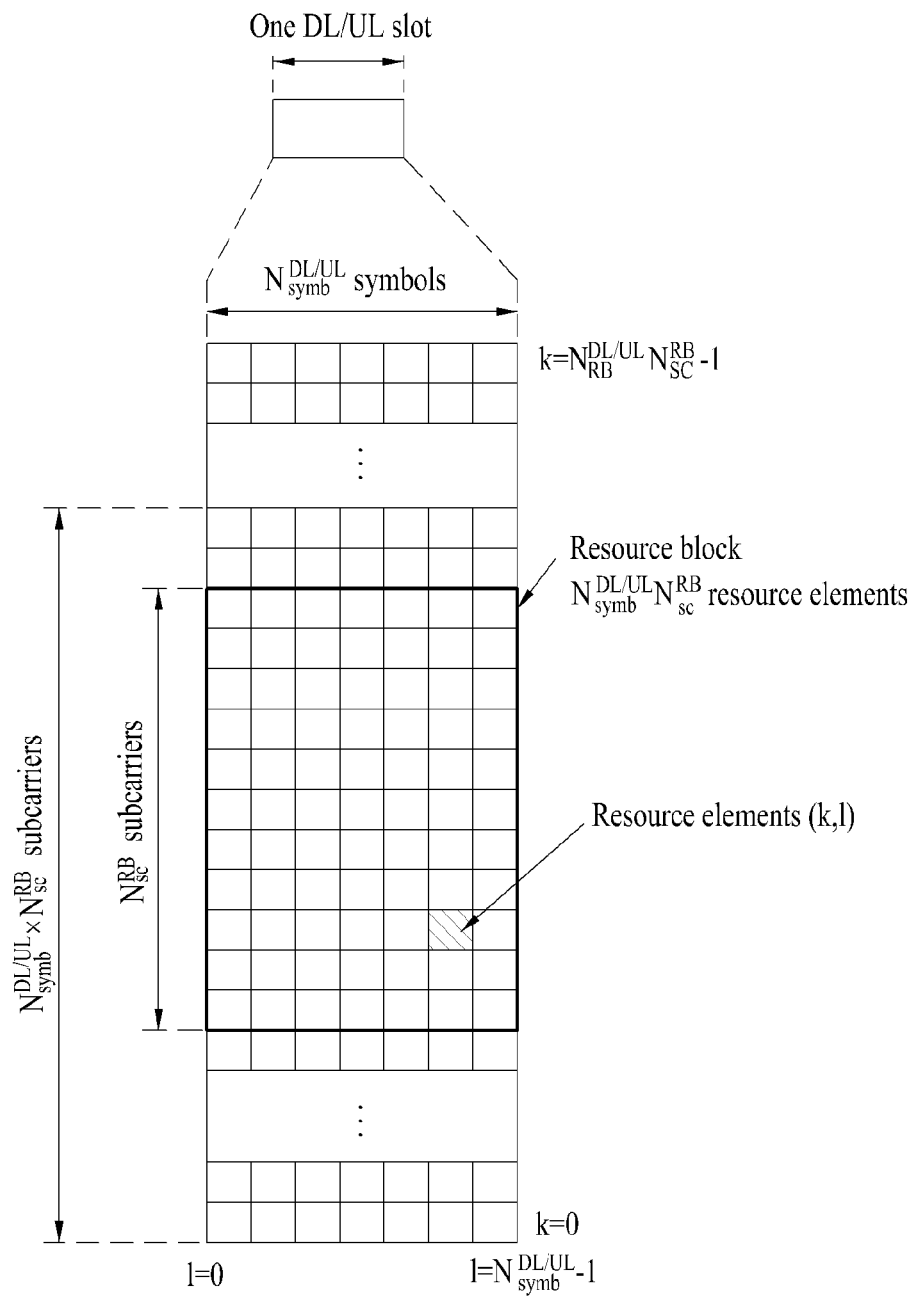
FIG. 4 is a diagram illustrating a slot structure in the LTE system to which the embodiments of the present disclosure are applicable.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including $N^{DL/UL_{RB}} N^{RB_{sc}}$ subcarriers and $N^{DL/UL_{symb}}$ symbols. $N^{DL_{RB}}$ represents the number of RBs in a DL slot, and $N^{UL_{RB}}$ represents the number of RBs in a UL slot. $N^{DL_{RB}}$ and $N^{UL_{RB}}$ are dependent on a DL bandwidth and a UL bandwidth, respectively. $N^{DL_{symb}}$ represents the number of symbols in the DL slot, and $N^{UL_{symb}}$ represents the number of symbols in the UL slot. $N^{RB_{sc}}$ represents the number of subcarriers in one RB. The number of symbols in a slot may vary according to an SCS and a CP length (see Table 1). For example, while one slot includes 7 symbols in a normal CP case, one slot includes 6 symbols in an extended CP case.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | | |
| 9 | $13168 \cdot T_s$ | | | — | | |
| 10 | $13168 \cdot T_s$ | $13152 \cdot T_s$ | $12800 \cdot T_s$ | — | — | — |

An RB is defined as $N^{DL/UL_{symbol}}$ (e.g., 7) consecutive symbols in the time domain by $N^{RB_{sc}}$, (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot. k is a frequency-domain index ranging from 0 to $N^{DL/UL_{RBx}}N^{RB_{sc}}-1$ and l is a time-domain index ranging from 0 to $N^{DU/UL_{symb}}-1$.

Figure 5:
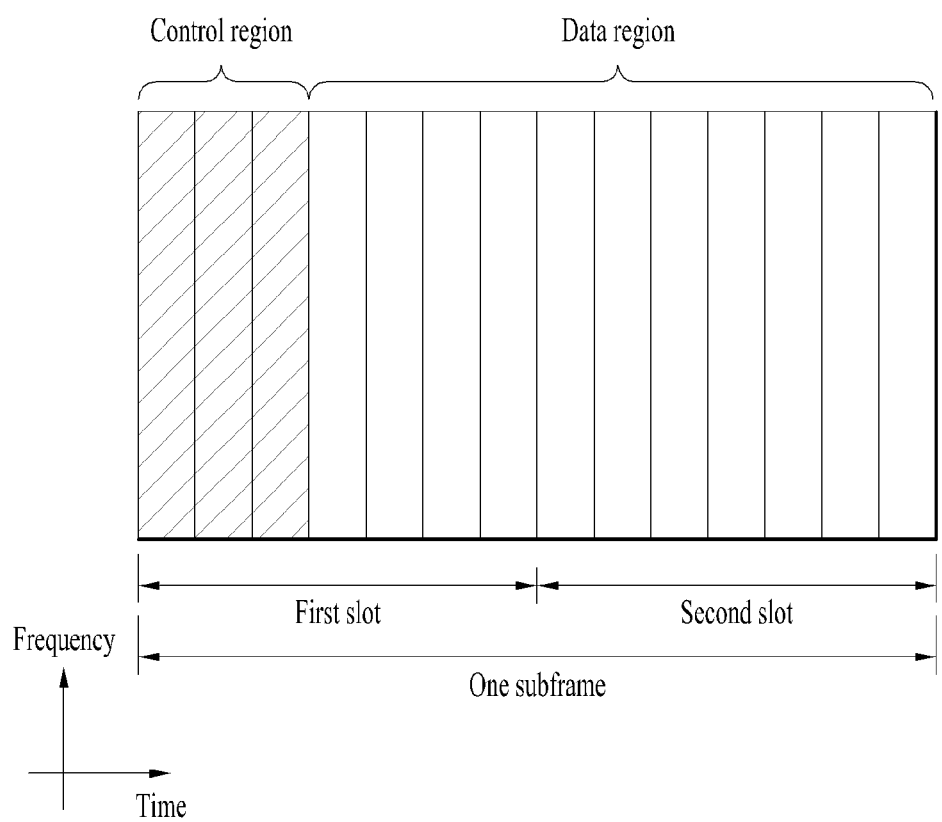
FIG. 5 is a diagram illustrating a downlink subframe structure in the LTE system to which the embodiments of the present disclosure are applicable.

FIG. 5 illustrates a DL subframe structure in an LTE system to which embodiments of the present disclosure are applicable.

Referring to FIG. 5, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, conveying information about the number of OFDM symbols (i.e., the size of a control region) used for transmission of control channels in the subframe. The PHICH is a response channel for a UL transmission, conveying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (Tx) power control command for any UE group.

Figure 6:
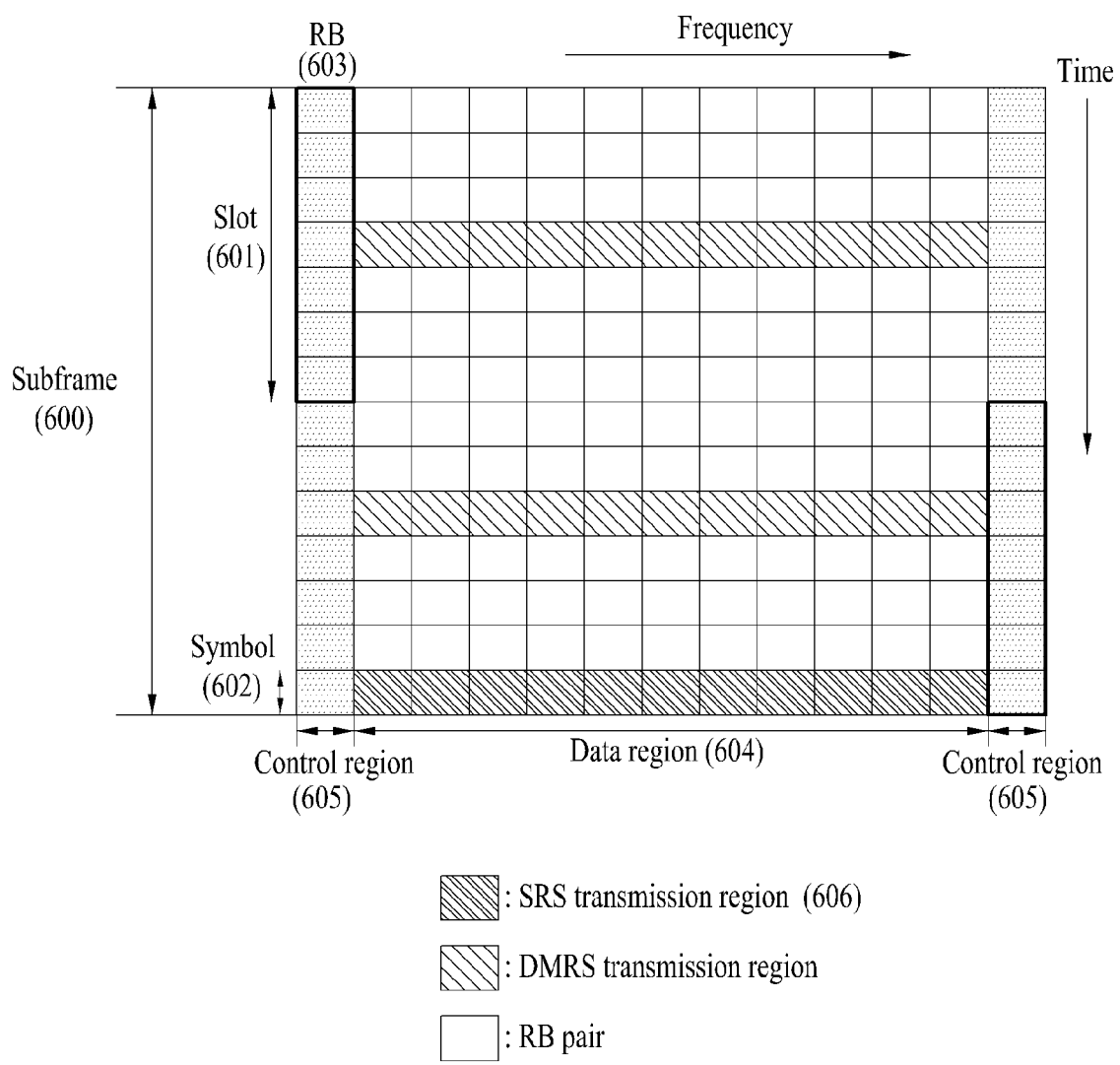
FIG. 6 is a diagram illustrating an uplink subframe structure in the LTE system to which the embodiments of the present disclosure are applicable.

FIG. 6 is a diagram illustrating a UL subframe structure in an LTE system to which embodiments of the present disclosure are applicable.

Referring to FIG. 6, one subframe 600 includes two 0.5-ms slots 601. Each slot includes a plurality of symbols 602, each corresponding to one SC-FDMA symbol. An RB 603 is a resource allocation unit corresponding to 12 subcarriers in the frequency domain by one slot in the time domain.

A UL subframe is divided largely into a control region 604 and a data region 605. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 7:
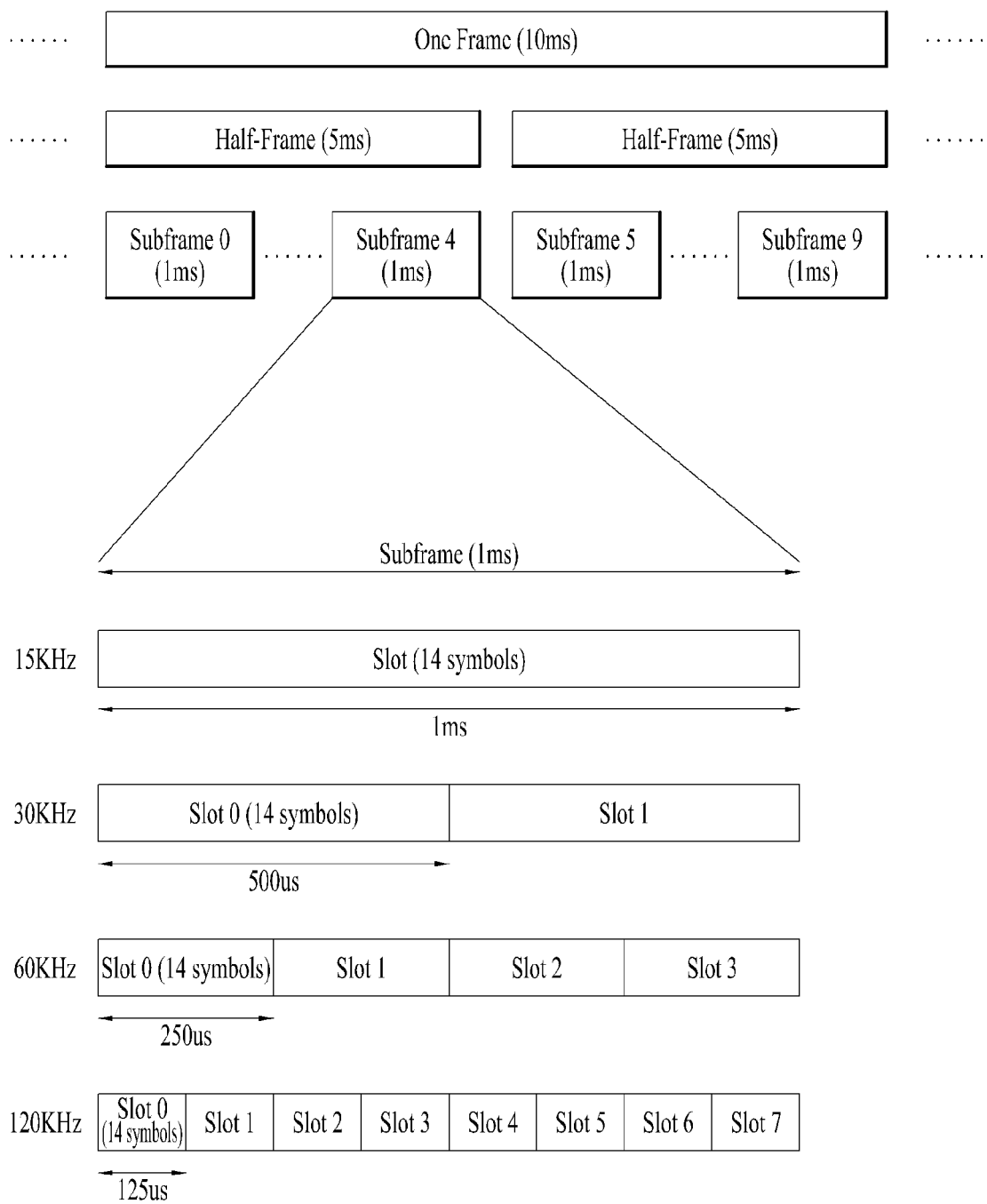
FIG. 7 is a diagram illustrating a radio frame structure in a new radio access technology (NR) system to which embodiments of the present disclosure are applicable.

FIG. 7 is a diagram illustrating a radio frame structure in an NR system to which embodiments of the present disclosure are applicable.

In the NR system, UL and DL transmissions are based on a frame as illustrated in FIG. 7. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot_{symb}}$ represents the number of symbols in a slot, $N^{frame,\mu_{slot}}$ represents the number of slots in a frame, and $N^{subframe,\mu_{slot}}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 8:
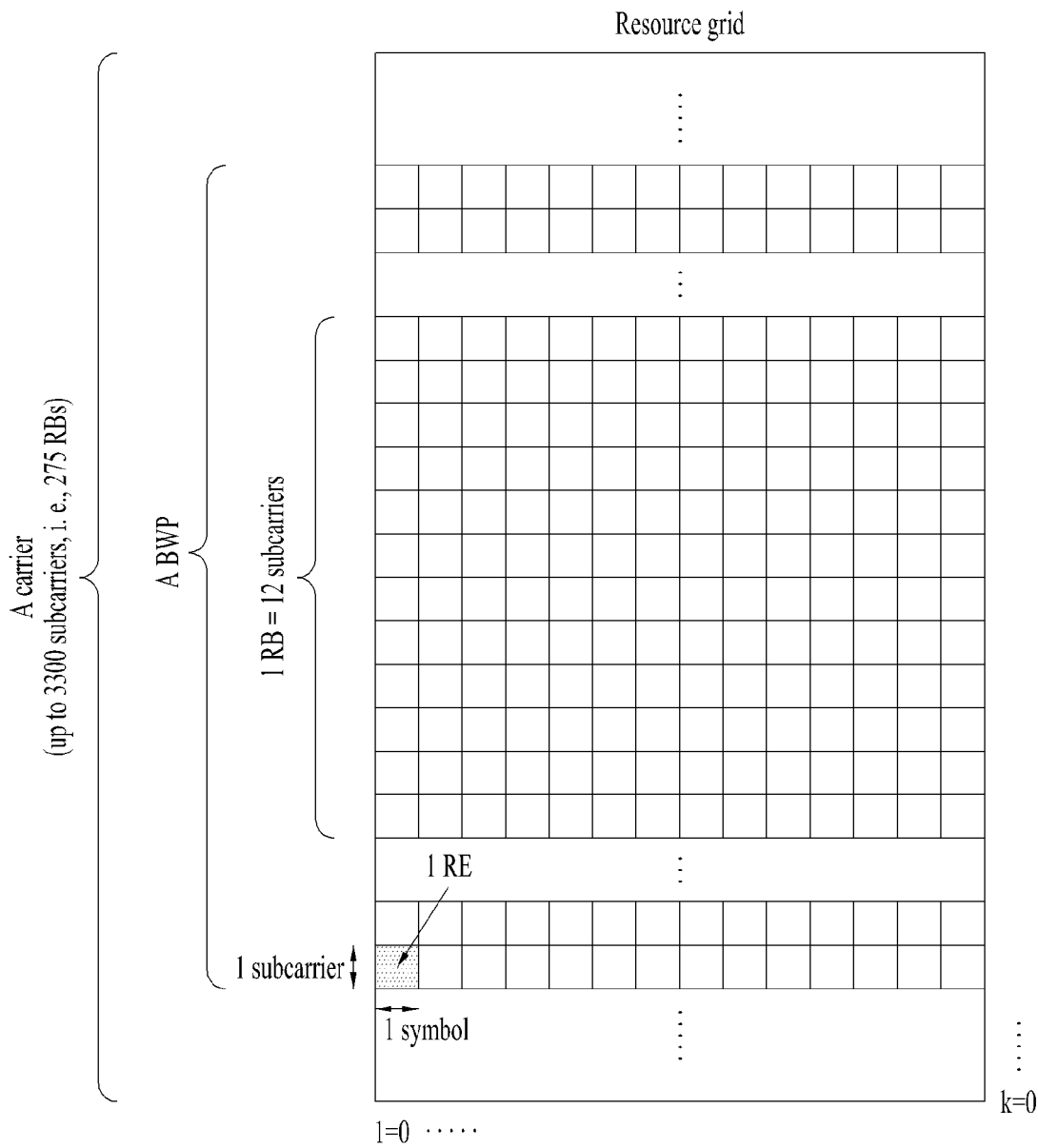
FIG. 8 is a diagram illustrating a slot structure in the NR system to which the embodiments of the present disclosure are applicable.

FIG. 8 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
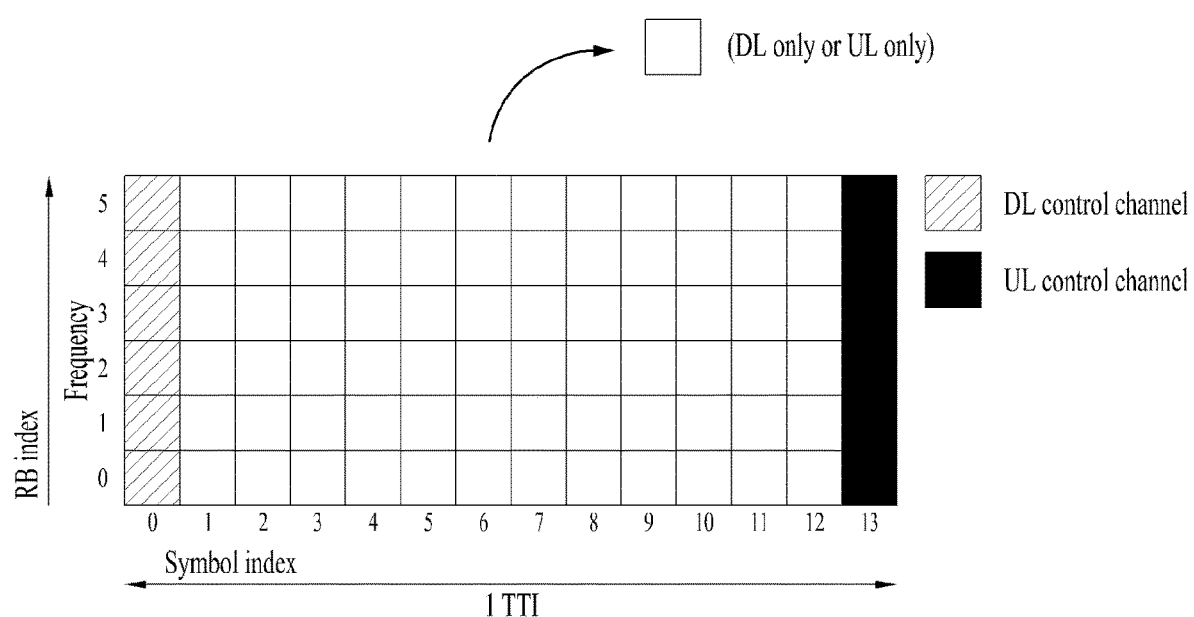
FIG. 9 is a diagram illustrating a self-contained slot structure in the NR system to which the embodiments of the present disclosure are applicable.

FIG. 9 is a diagram illustrating a self-contained slot structures in an NR system to which embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
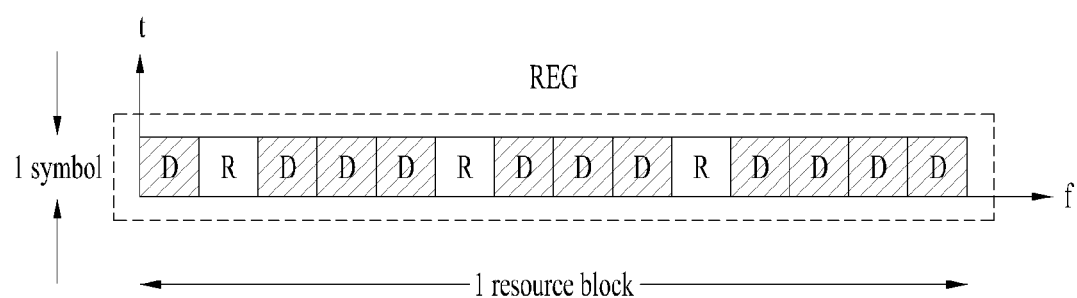
FIG. 10 is a diagram illustrating a resource element group (REG) structure in the NR system to which the embodiments of the present disclosure are applicable.

FIG. 10 is a diagram illustrating the structure of one REG in an NR system to which embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 6 lists exemplary PUCCH formats.

TABLE 6

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 11:
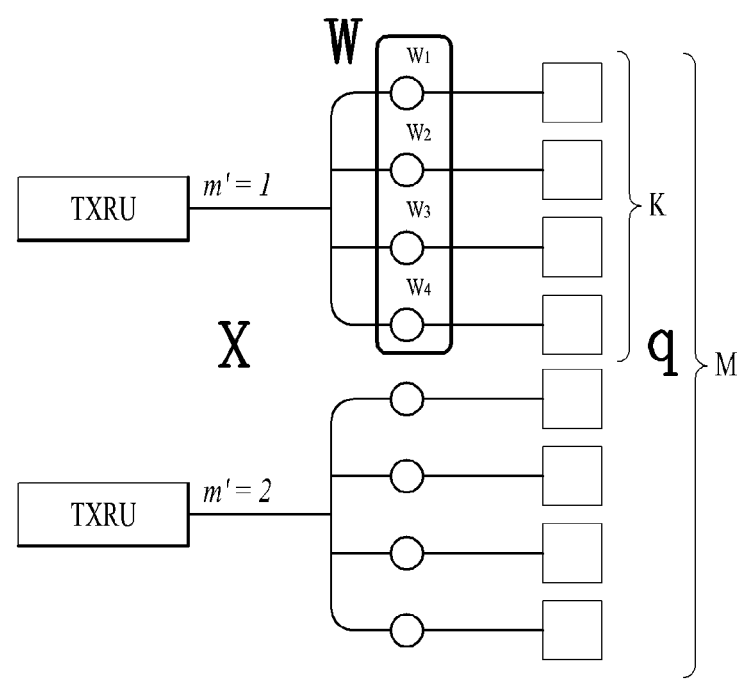
FIGS. 11 and 12 are diagrams illustrating representative methods of connecting transceiver units (TXRUs) to antenna elements.
Figure 12:
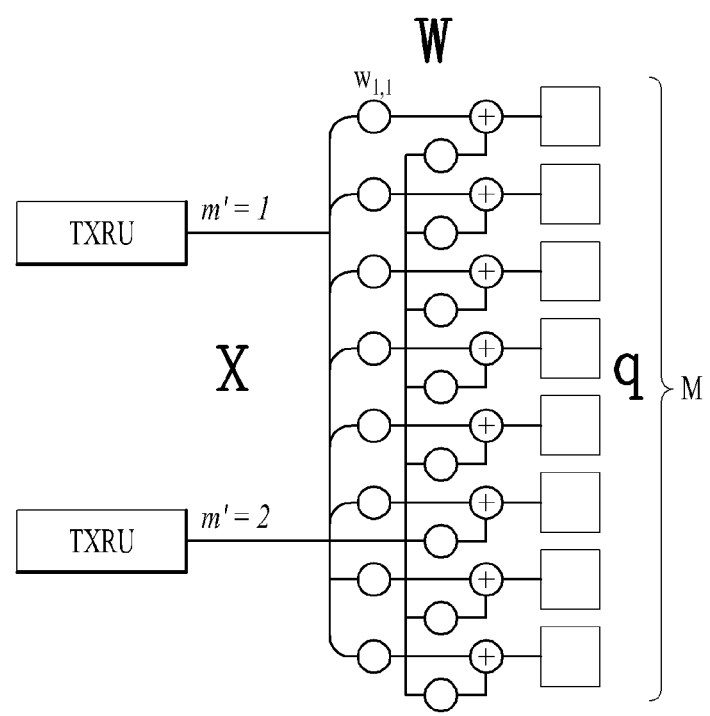

FIGS. 11 and 12 are diagrams illustrating representative methods for connecting TXRUs to antenna elements. Here, the TXRU virtualization model represents the relationship between TXRU output signals and antenna element output signals.

FIG. 11 shows a method for connecting TXRUs to sub-arrays. In FIG. 11, one antenna element is connected to one TXRU.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 13:
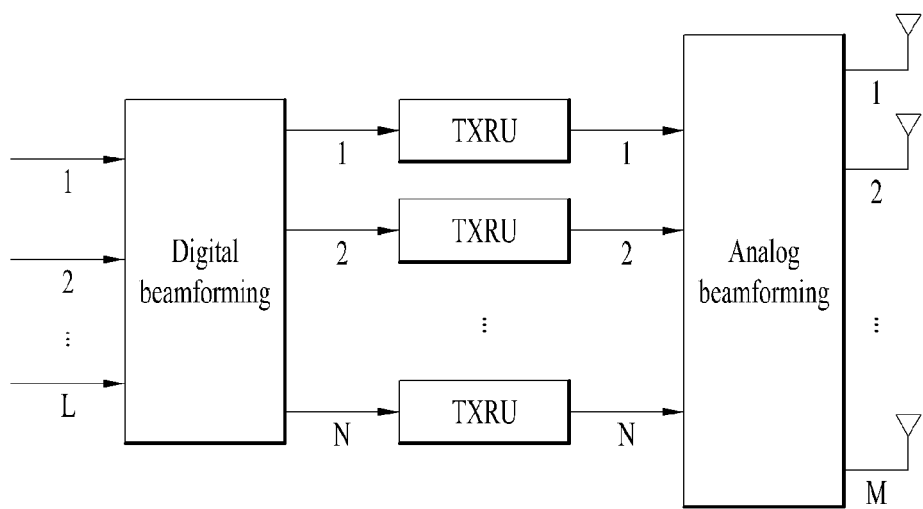
FIG. 13 is a schematic diagram illustrating a hybrid beamforming structure from the perspective of TXRUs and physical antennas according to an example of the present disclosure.

FIG. 13 is a diagram schematically illustrating an exemplary hybrid BF structure from the perspective of TXRUs and physical antennas according to the present invention. In FIG. 13, the number of digital beams is L and the number analog beams is N.

Additionally, in the NR system to which the present invention is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present invention considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present invention is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 14:
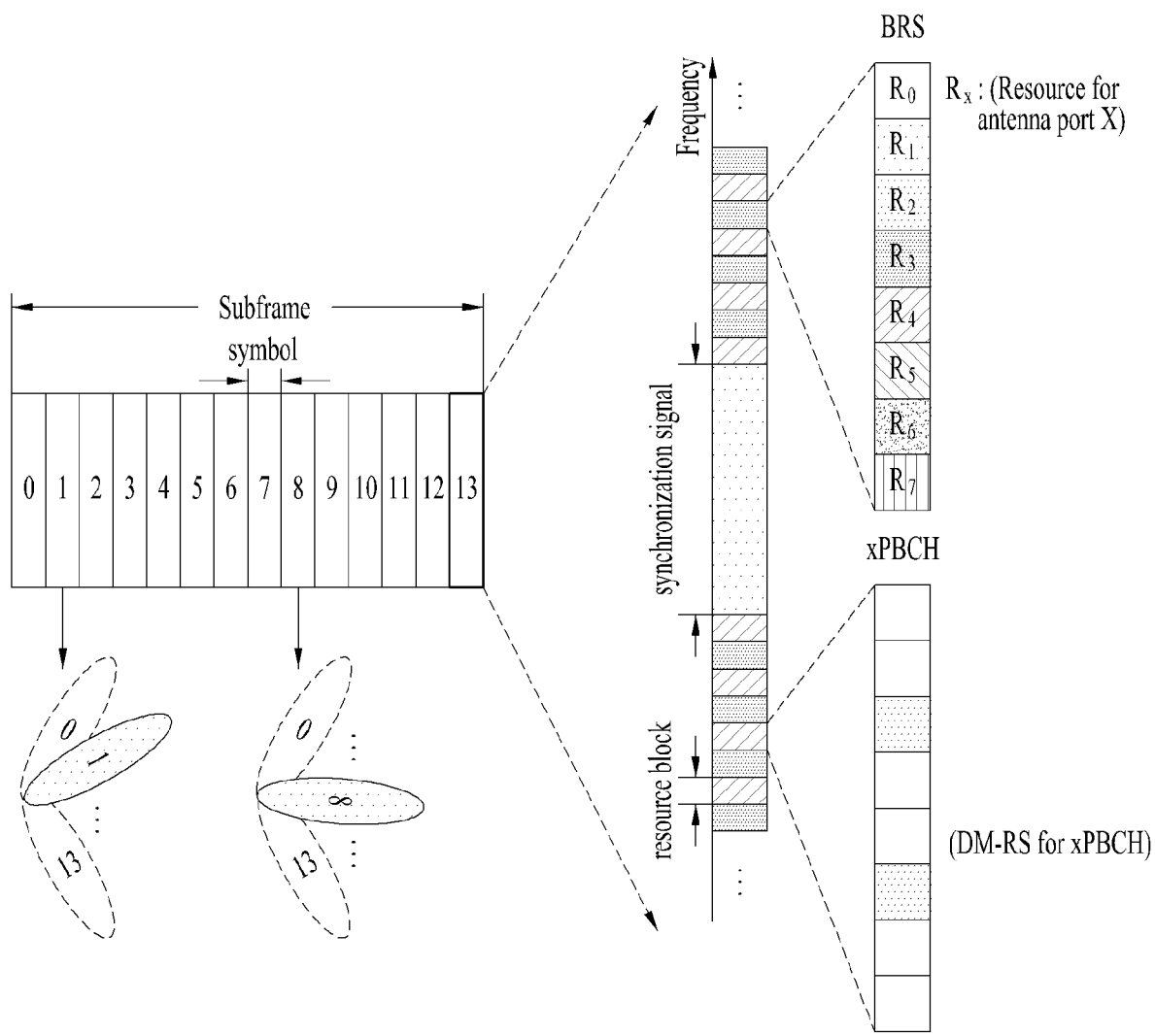
FIG. 14 is a schematic diagram illustrating a beam sweeping operation for a synchronization signal and system information in a downlink transmission procedure according to an example of the present disclosure.

FIG. 14 is a diagram schematically illustrating an exemplary beam sweeping operation for a synchronization signal and system information in a DL transmission procedure according to the present invention.

In FIG. 14 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 15:
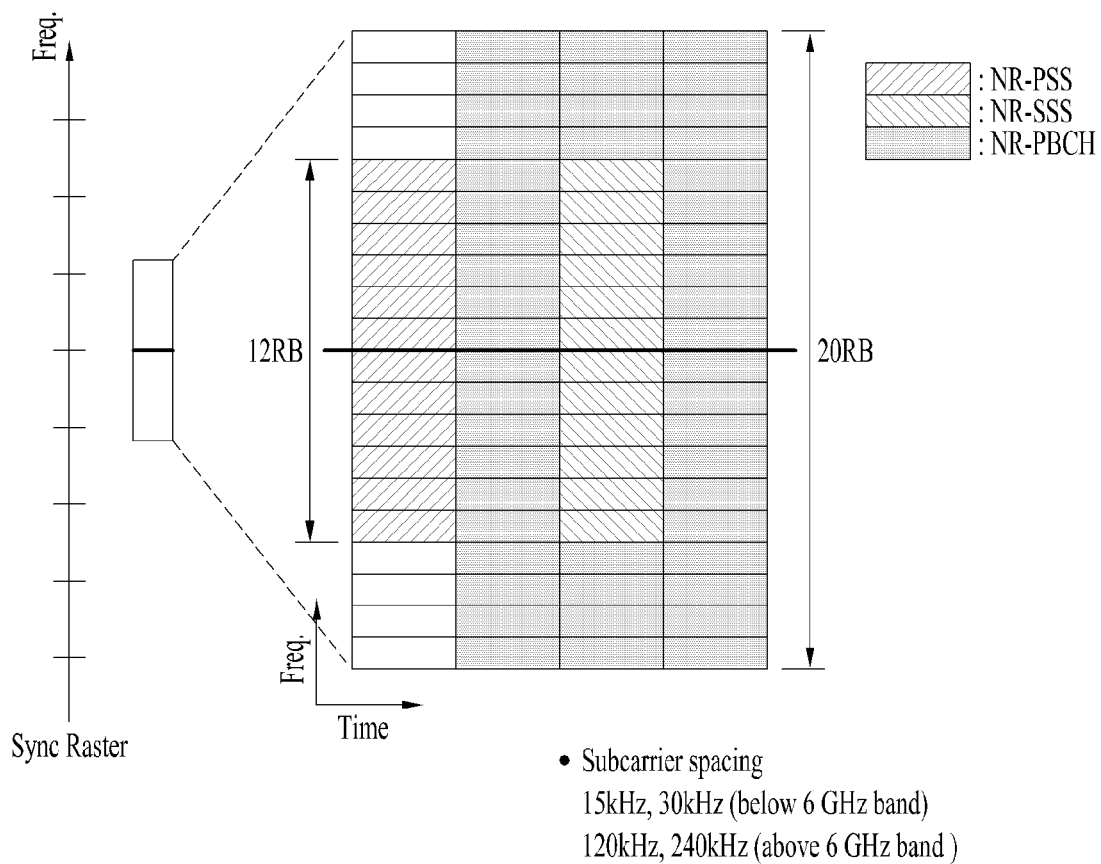
FIG. 15 is a schematic diagram illustrating a synchronization signal/physical broadcast channel (SS/PBCH) block applicable to the present disclosure.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 16:
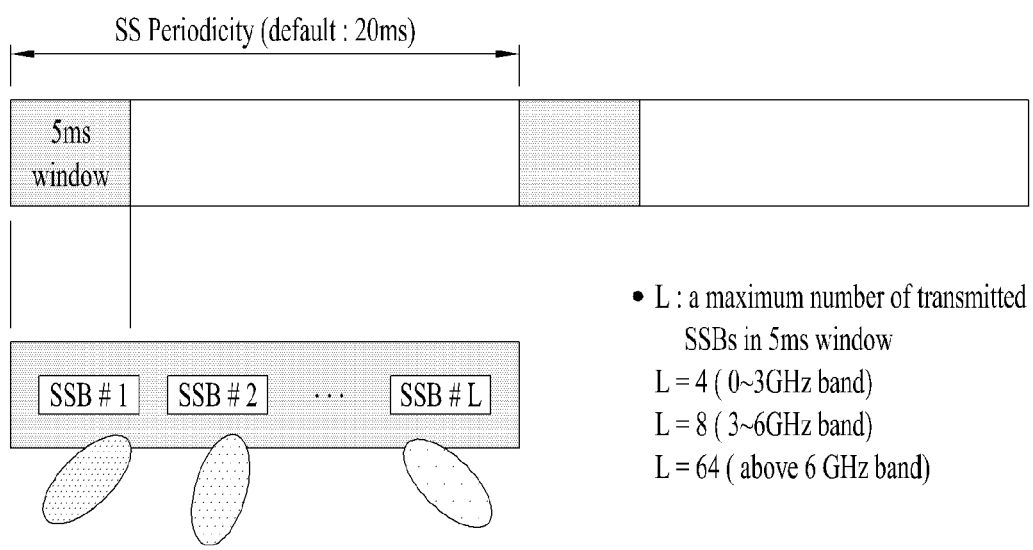
FIG. 16 is a schematic diagram illustrating an SS/PBCH block transmission configuration applicable to the present disclosure.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH contents-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the gNB.

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.6. Quasi Co-located or Quasi Co-location (QCL)

In the present disclosure, QCL may mean one of the following.

(1) If two antenna ports are "quasi co-located (QCL)", the UE may assume that large-scale properties of a signal received from a first antenna port may be inferred from a signal received from the other antenna port. The "large-scale properties" may include one or more of the following.

Delay spread
Doppler spread
Frequency shift
Average received power
Received Timing (2) If two antenna ports are "quasi co-located (QCL)", the UE may assume that large-scale properties of a channel over which a symbol on one antenna port is conveyed may be inferred from a channel over which a symbol on the other antenna port is conveyed). The "large-scale properties" may include one or more of the following.

Delay spread
Doppler spread
Doppler shift
Average gain
Average delay
Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).
Angular spread (AS): When it is said that QCL is guaranteed between antenna ports in terms of AS, this may imply that an AS estimated from one antenna port may be derived/estimated/applied from an AS estimated from another antenna port.
Power Angle(-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

1.7. Bandwidth Part (BWP)

In the NR system to which the present disclosure is applicable, frequency resources of up to 400 MHz per component carrier (CC) may be allocated/supported. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include contiguous RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency area in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for a UE associated with the wideband CC, and activate at least one of DL/UL BWPs configured at a specific time point (by L1 signaling (e.g., DCI or the like), MAC signaling, RRC signaling, or the like). The activated DL/UL BWP may be referred to as an active DL/UL BWP. During initial access or before an RRC connection setup, the UE may not receive a configuration for a DL/UL BWP from the BS. A DL/UL BWP assumed for the UE is defined as an initial active DL/UL BWP.

1.8. Phase Tracking Reference Signal (PT-RS)

Phase noise related to the present disclosure will be described. Jitter occurring on the time axis is observed as phase noise on the frequency axis. This phase noise randomly changes the phase of a received signal on the time axis as in the following equation.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In Equation 1, parameters $r_n$, $s_n$, $d_k$, $\phi_n$ represent phase rotation values caused by a received signal, a time-axis signal, a frequency-axis signal, and phase noise, respectively. When the received signal is subjected to DFT in Equation 1, Equation 2 is derived.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)n/N} \quad \text{[Equation 2]}$$

In Equation 2, parameters $$\frac{1}{N} \sum_{n=0}^{N-1} e^{j\phi_n} \text{ and } \frac{1}{N} \sum_{\substack{t=0 \\ t \neq k}}^{N-1} d_t \sum_{n=0}^{N-1} e^{j\phi_n} e^{j2\pi(t-k)n/N}$$

represent a common phase error (CPE) and inter-cell interference (ICI), respectively. As the correlation between phase noises increases, the CPE in Equation 2 has a larger value. Although the CPE is a kind of carrier frequency offset (CFO) in a wireless local area network (WLAN) system, the CPE and the CFO may be similarly interpreted in terms of phase noise from the viewpoint of a UE.

The UE removes the CPE/CFO which is phase noise on the frequency axis by estimating the CPE/CFO, and the process of estimating the CPE/CFO for the received signal should precede for accurate decoding of the received signal. Accordingly, the BS may transmit a predetermined signal to the UE so that the UE may accurately estimate the CPE/

CFO. This signal used to estimate phase noise may be a pilot signal shared between the UE and the BS or a signal modified from a data signal or a duplicate signal of the data signal. Hereinafter, signals used for estimating phase noise are collectively called a PT-RS.

1.8.1. Time-Domain Pattern (or Time Density)

Figure 17:
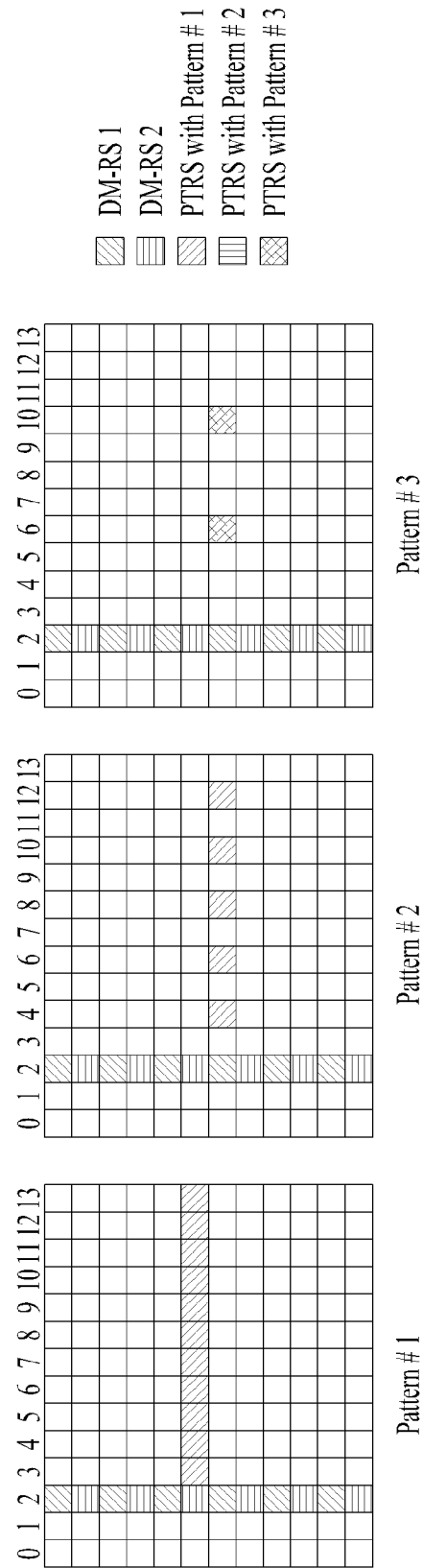
FIG. 17 is a diagram illustrating time-domain phase tracking reference signal (PT-RS) patterns applicable to the present disclosure.

FIG. 17 is a diagram illustrating time-domain PT-RS patterns applicable to the present disclosure.

As illustrated in FIG. 17, the PT-RS may have a different pattern according to a modulation and coding scheme (MCS) level applied to the PT-RS.

TABLE 7

| MCS level | PT-RS time pattern |
| --- | --- |
| (64QAM, CR = 1/3) <= MCS < (64QAM, CR = 1/2) | #3 |
| (64QAM, CR = 1/2) <= MCS < (64QAM, CR = 5/6) | #2 |
| (64QAM, CR = 5/6) <= MCS | #1 |

As illustrated in FIG. 17 and Table 7, the PT-RS may be mapped and transmitted in a different pattern according to an applied MCS level.

The configuration may further be generalized such that time-domain patterns (or time densities) of the PT-RS may be defined as illustrated in the following table.

TABLE 8

| Scheduled MCS | Time density ($L_{PT-RS}$) |
| --- | --- |
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Time density 1 may correspond to Pattern #1, time density 2 may correspond to Pattern #2, and time density 4 may correspond to Pattern #3 in FIG. 17.

The parameters, ptrs-MCS1, ptrs-MCS2, ptrs-MCS3, and ptrs-MCS4 in Table 8 may be defined by higher-layer signaling.

1.8.2. Frequency-Domain Pattern (or Frequency Density)

The PT-RS according to the present disclosure may be mapped to one subcarrier per RB, per two RBs, or per four RBs. The frequency-domain pattern (or frequency density) of the PT-RS may be configured according to the size of a scheduled bandwidth.

For example, frequency densities as listed in Table 9 may be available according to scheduled bandwidths.

TABLE 9

| Scheduled BW | Frequency density |
| --- | --- |
| 0 < $N_{RB}$ <= 4 | No PT-RS |
| 5 < $N_{RB}$ <= 8 | 1 |
| 9 < $N_{RB}$ <= 16 | 1/2 |
| 17 < $N_{RB}$ <= 32 | 1/4 |

Frequency density 1 corresponds to a frequency-domain pattern in which the PT-RS is mapped to one subcarrier per RB and transmitted, frequency density 1/2 corresponds to a frequency-domain pattern in which the PT-RS is mapped to one subcarrier per two RBs and transmitted, and frequency density 1/4 corresponds to a frequency-domain pattern in which the PT-RS is mapped to one subcarrier per four RBs and transmitted.

The configuration may further be generalized such that the frequency-domain pattern (or frequency density) of the PT-RS may be defined as listed in the following table.

TABLE 10

| Scheduled bandwidth | Frequency density ($K_{PT-RS}$) |
| --- | --- |
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

Frequency density 2 may correspond to a frequency-domain pattern in which the PT-RS is mapped to one subcarrier every 2 RBs and transmitted, and frequency density 4 may correspond to a frequency-domain pattern in which the PT-RS is mapped to one subcarrier every 4 RBs and transmitted.

In the above configuration, $N_{RB0}$ and $N_{RB1}$, which are reference values for a scheduled bandwidth for determining a frequency density, may be defined by higher-layer signaling.

1.9. Demodulation Reference Signal (DMRS)

In the NR system to which the present disclosure is applicable, the DMRS may be transmitted and received in a front-loaded structure. Alternatively, a DMRS may further be transmitted and received in addition to the front-loaded DMRS.

The front-loaded DMRS may support fast decoding. A first OFDM symbol carrying the front-loaded DMRS may be determined to be a third (e.g., l=2) or fourth OFDM symbol (e.g., l=3). The position of the first OFDM symbol may be indicated by the PBCH.

The number of OFDM symbols occupied by the front-loaded DMRS may be indicated by DCI and RRC signaling in combination.

The additional DMRS may be configured for a high-speed UE. The additional DMRS may be located in the middle/last symbol(s) of a slot. When one front-loaded DMRS symbol is configured, the additional DMRS may be allocated to 0 to 3 OFDM symbols. When two front-loaded DMRS symbols are configured, the additional DMRS may be allocated to 0 or 2 OFDM symbols.

Two types of front-loaded DMRSs may be defined, and one of the two types may be indicated by higher-layer signaling (e.g., RRC signaling).

FIG. 18 is a schematic diagram illustrating two DMRS configuration types applicable to the present disclosure.

In FIG. 18, P0 to P11 may correspond to port numbers 1000 to 1011, respectively. A DMRS configuration type substantially configured for the UE between the two DMRS configuration types may be indicated by higher-layer signaling (e.g., RRC signaling).

DMRS configuration type 1 may be classified as follows according to the number of OFDM symbols to which the front-loaded DMRS is allocated.

DMRS Configuration Type 1 and the Number of OFDM Symbols to which Front-Loaded DMRS is Allocated=1

Up to 4 ports (e.g., P0 to P3) may be multiplexed based on length-2 frequency-code division multiplexing (F-CDM) and frequency division multiplexing (FDM). An RS density may be set to 6 REs per port in an RB.

DMRS Configuration Type 1 and the Number of OFDM Symbols to which Front-Loaded DMRS is Allocated=2

Up to 8 ports (e.g., P0 to P7) may be multiplexed based on length-2 F-CDM, length-2 T-CDM, and FDM. When the existence of the PT-RS is configured by higher-layer signaling, T-CDM may be fixed to [1 1]. An RS density may be set to 12 REs per port in an RB.

DMRS configuration type 2 may be classified as follows according to the number of OFDM symbols to which the front-loaded DMRS is allocated.

DMRS Configuration Type 2 and the Number of OFDM Symbols to which Front-Loaded DMRS is Allocated=1

Up to six ports (e.g., P0 to P5) may be multiplexed based on length-2 F-CDM and FDM. An RS density may be set to 4 REs per port in an RB.

DMRS Configuration Type 2 and the Number of OFDM Symbols to which Front-Loaded DMRS is Allocated=2

Up to 12 ports (e.g., P0 to P11) may be multiplexed based on length-2 F-CDM, length-2 time-code division multiplexing (T-CDM), and FDM. When the existence of the PT-RS is configured by higher-layer signaling, T-CDM may be fixed to [1 1]. An RS density may be set to 8 REs per port in an RB.

Figure 19:
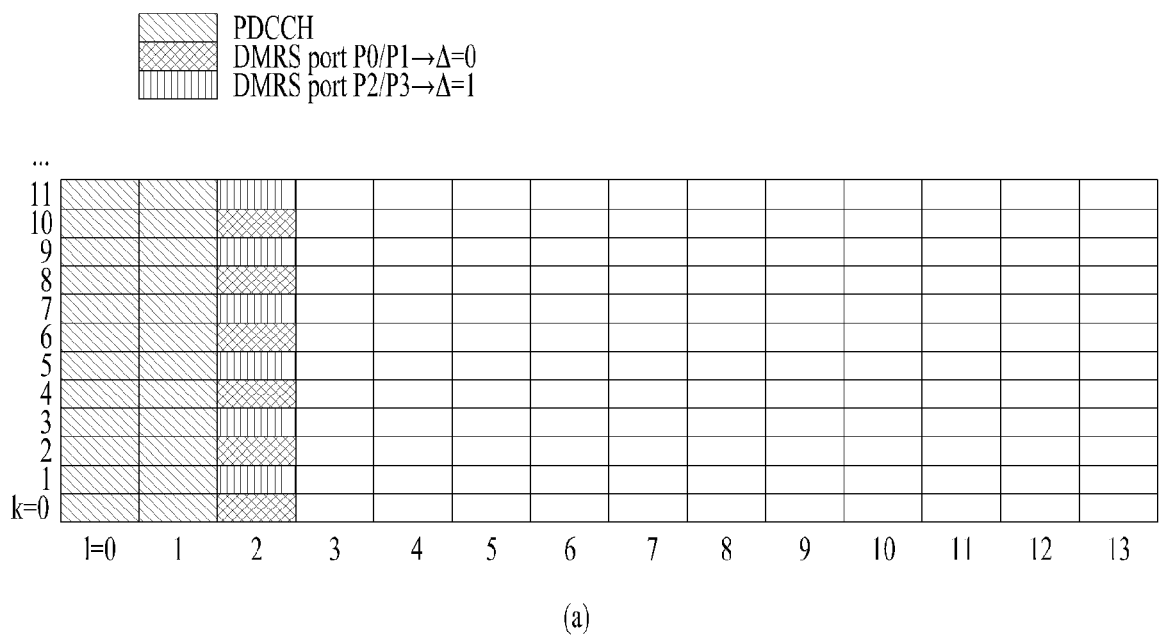
FIG. 19 is a schematic diagram illustrating exemplary front-loaded DMRSs of a first DMRS configuration type, which are applicable to the present disclosure.
Figure 19:
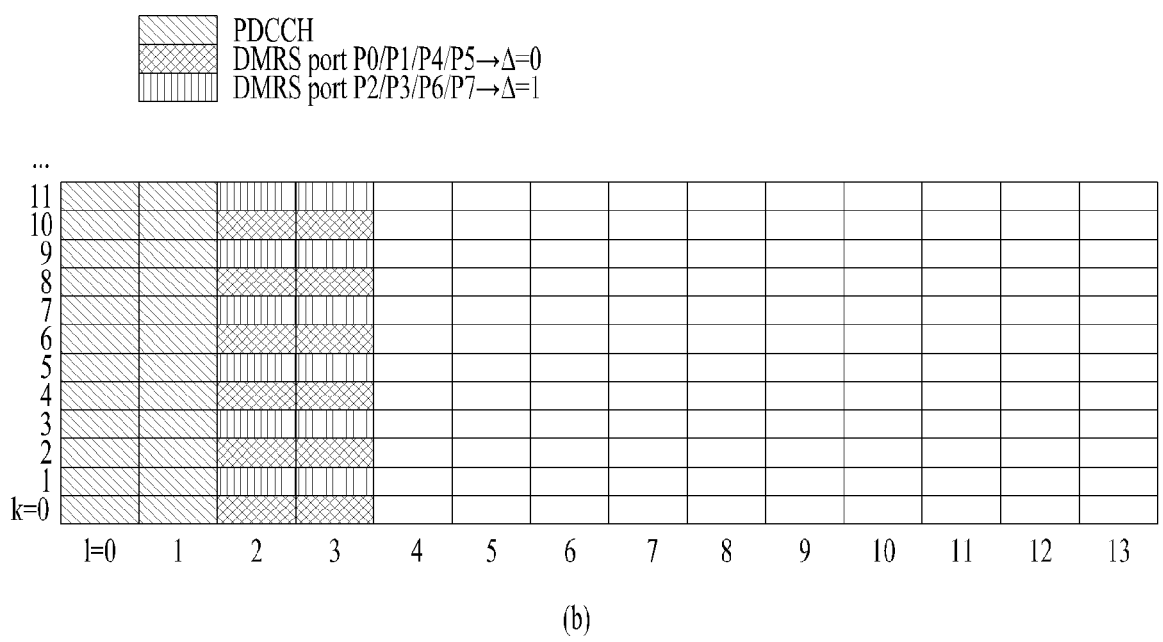

FIG. 19 is a schematic diagram illustrating an exemplary front-loaded DMRS of DMRS configuration type 1 applicable to the present disclosure.

More specifically, FIG. 19(a) illustrates a front-loaded DMRS with one symbol, and in FIG. 19 (b) illustrates a front-loaded DMRS with two symbols.

In FIG. 19, Δ represents a DMRS offset value on the frequency axis. DMRS ports having the same Δ may be multiplexed in code division multiplexing (CDM) in the frequency domain (CDM-F) or in the time domain (CDM-T). In addition, DMRS ports having different Δ may be multiplexed in CDM-F.

The UE may acquire DMRS port configuration information configured by the BS from DCI.

2. Unlicensed Band System

Figure 20:
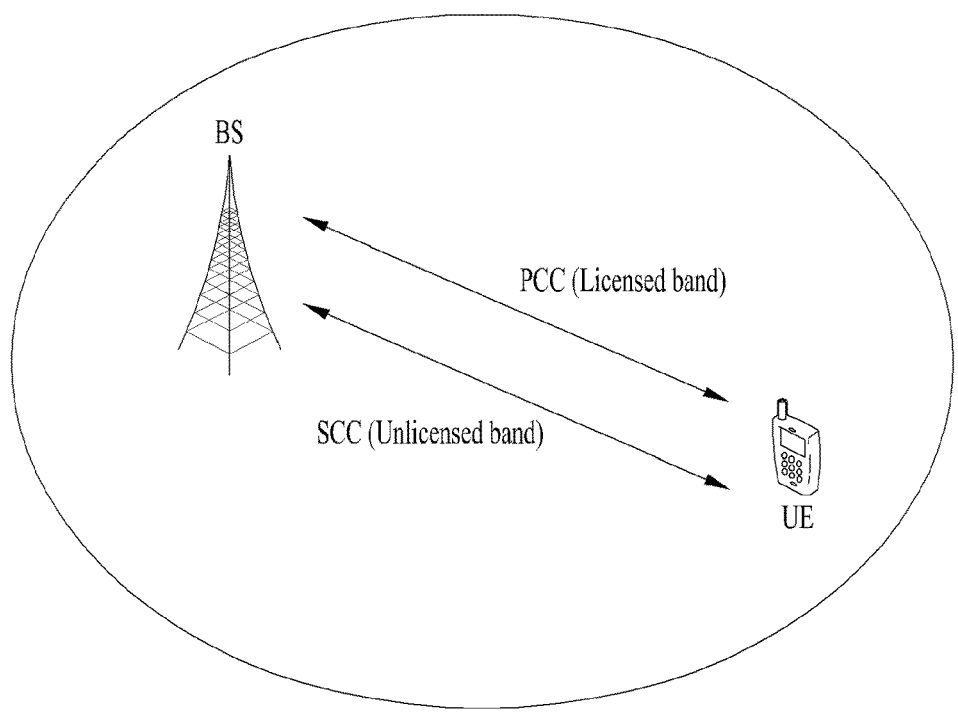
FIG. 20 illustrates an exemplary wireless communication system supporting an unlicensed band, which is applicable to the present disclosure.
Figure 20:
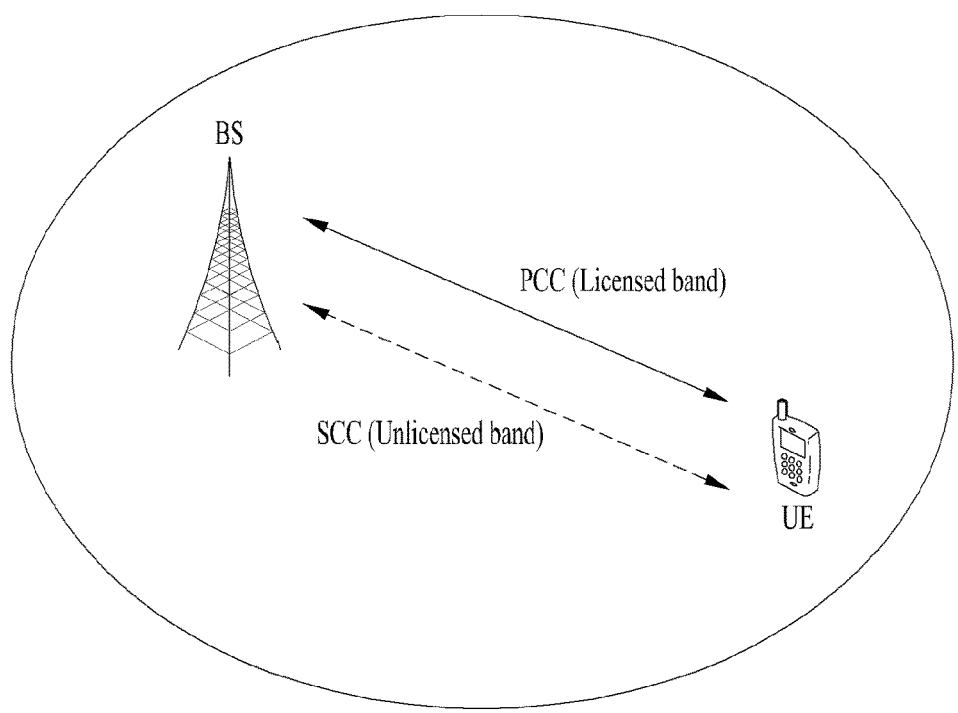

FIG. 20 illustrates an exemplary wireless communication system supporting an unlicensed band, which is applicable to the present disclosure.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as U-band) is defined as a U-cell, and a carrier of the U-cell is defined as a (DL/UL) UCC. The carrier/carrier-frequency of the cell may refer to the operating frequency (e.g., center frequency) of the cell. A cell/carrier (e.g., CC) is collectively referred to as a cell.

As illustrated in FIG. 20(a), when the UE and the BS transmit and receive signals in carrier-aggregated LCC and UCC, the LCC may be configured as a primary CC (PCC) and the UCC may be configured as a secondary CC (SCC).

As illustrated in FIG. 20(b), the UE and the BS may transmit and receive signals in one UCC or a plurality of carrier-aggregated LCC and UCC. That is, the UE and the BS may transmit and receive signals only in the UCC(s) without the LCC.

The above-described operation of transmitting and receiving a signal in an unlicensed band according to the present disclosure may be performed based on all the deployment scenarios described above (unless otherwise stated).

2.1. Radio Frame Structure for Unlicensed Band

Frame structure type 3 of LTE (see FIG. 3) or the NR frame structure (see FIG. 7) may be used for operation in the unlicensed band. The configuration of OFDM symbols occupied for a UL/DL signal transmission in the frame structure for the unlicensed band may be configured by the BS. Herein, an OFDM symbol may be replaced with an SC-FDM(A) symbol.

For a DL signal transmission in the unlicensed band, the BS may indicate the configuration of OFDM symbols used in subframe #n to the UE by signaling. In the following description, a subframe may be replaced with a slot or a TU.

Specifically, in the LTE system supporting the unlicensed band, the UE may assume (or identify) the configuration of OFDM symbols occupied in subframe #n by a specific field (e.g., a Subframe configuration for LAA field) in DCI received in subframe #n−1 or subframe #n from the BS.

Table 11 illustrates an exemplary method of indicating the configuration of OFDM symbols used for transmission of a DL physical channel and/or physical signal in a current and/or next subframe by the Subframe configuration for LAA field.

TABLE 11

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission duration to the UE by signaling.

Specifically, in the LTE system supporting the unlicensed band, the UE may acquire 'UL duration' and 'UL offset' information for subframe #n from a 'UL duration and offset' field in detected DCI.

Table 12 illustrates an exemplary method of indicating a UL offset and UL duration configuration by the UL duration and offset field in the LTE system.

TABLE 12

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |

TABLE 12-continued

| Value of<br>'UL duration and offset' field | UL offset, l<br>(in subframes) | UL duration, d<br>(in subframes) |
|---|---|---|
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) UL offset 1 and UL duration d for subframe #n, the UE may not need to receive a DL physical channel and/or physical signal in subframe #n+1+i (i=0, 1, . . . , d−1).

2.2. DL Channel Access Procedure (DL CAP)

For a DL signal transmission in the unlicensed band, the BS may perform a DL CAP for the unlicensed band. On the assumption that the BS is configured with a PCell that is a licensed band and one or more SCells which are unlicensed bands, a DL CAP operation applicable to the present disclosure will be described below in detail, with the unlicensed bands represented as licensed assisted access (LAA) SCells. The DL CAP operation may be applied in the same manner even when only an unlicensed band is configured for the BS.

2.2.1. Channel Access Procedure for Transmission(s) Including PDSCH/PDCCH/EPDCCH The BS senses whether a channel is in an idle state for a slot duration of a defer duration $T_d$. After a counter N is decremented to 0 in step 4 as described later, the BS may perform a transmission including a PDSCH/PDCCH/EPDCCH on a carrier on which the next LAA SCell(s) transmission is performed. The counter N may be adjusted by sensing the channel for an additional slot duration according to the following procedure.

1) Set N=$N_{init}$ where $N_{init}$ is a random number uniformly distributed between 0 and $CW_p$, and go to step 4.

2) If N>0 and the BS chooses to reduce the counter, set N=N−1.

3) Sense the channel for an additional slot duration, and if the additional slot duration is idle, go to step 4. Else, go to step 5.

4) If N=0, stop. Else, go to step 2.

5) Sense the channel until a busy slot is detected within the additional defer duration $T_d$ or all slots of the additional defer duration $T_d$ are sensed as idle.

6) If the channel is sensed as idle for all slot durations of the additional defer duration $T_d$, go to step 4. Else, go to step 5.

The above-described CAP for a transmission including a PDSCH/PDCCH/EPDCCH of the BS may be summarized as follows.

Figure 21:
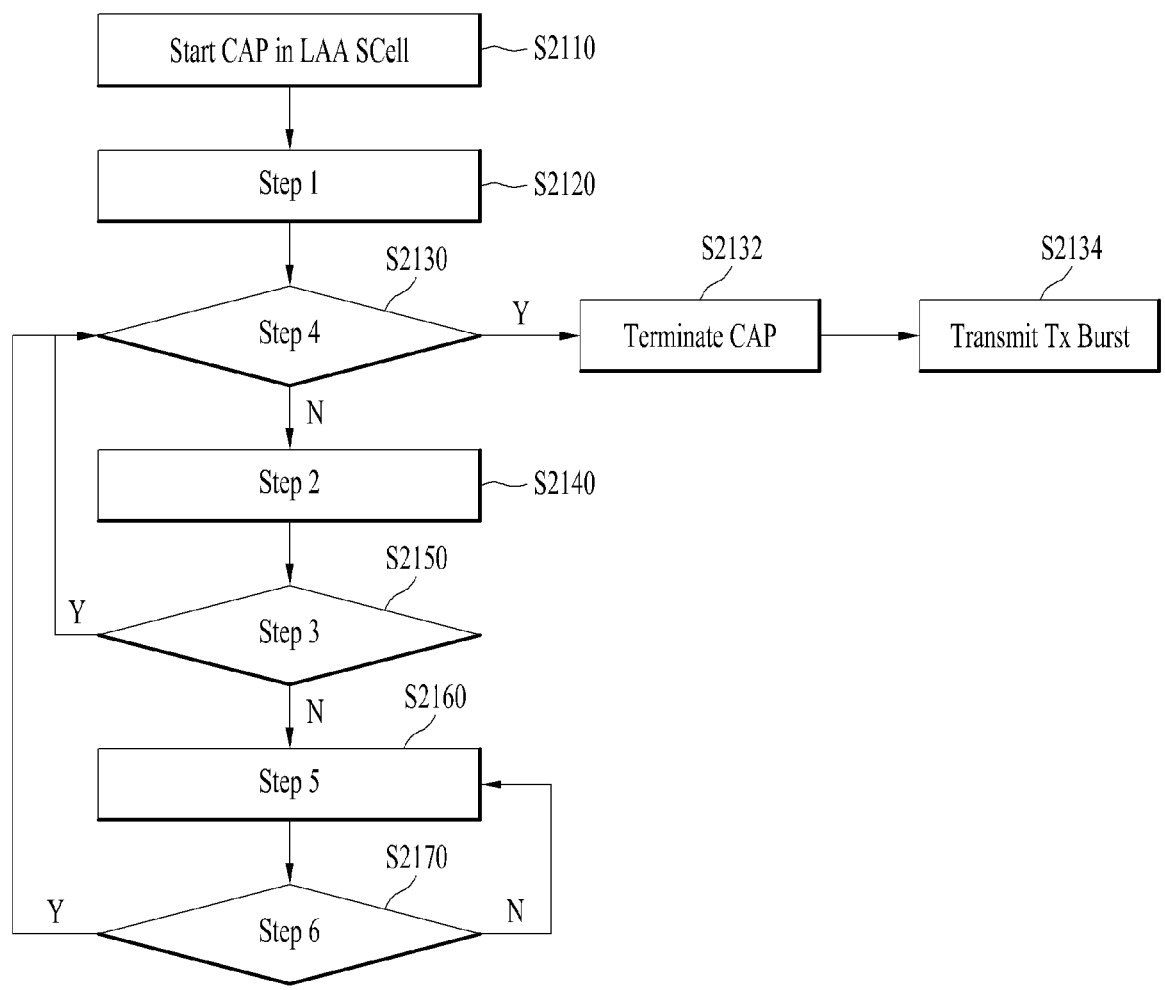
FIG. 21 is a diagram illustrating a channel access procedure (CAP) for transmission in an unlicensed band, which is applicable to the present disclosure.

FIG. 21 is a flowchart illustrating a CAP for transmission in an unlicensed band, which is applicable to the present disclosure.

For a DL transmission, a transmission node (e.g., a BS) may initiate the CAP to operate in LAA SCell(s) which is unlicensed band cell(s) (S2110).

The BS may randomly select a backoff counter N within a contention window (CW) according to step 1. N is set to an initial value, $N_{init}$ (S2120). $N_{init}$ is a random value selected from among the values between 0 and $CW_p$.

Subsequently, if the backoff counter N is 0 in step 4 (Y in S2130), the BS terminates the CAP (S2132). Subsequently, the BS may perform a Tx burst transmission including a PDSCH/PDCCH/EPDCCH (S2134). On the other hand, if the backoff counter N is not 0 (N in S2130), the BS decrements the backoff counter N by 1 according to step 2 (S2140).

Subsequently, the BS determines whether the channel of the LAA SCell(s) is in an idle state (S2150). If the channel is in the idle state (Y in S2150), the BS determines whether the backoff counter N is 0 (S2130).

On the contrary, if the channel is not idle in step S2150, that is, the channel is busy (N in S2150), the BS determines whether the channel is in the idle state for a defer duration $T_d$ (25 usec or more) longer than a slot time (e.g., 9 usec) according to step 5 (S2160). If the channel is idle for the defer duration (Y in S2170), the BS may resume the CAP.

For example, if the backoff counter $N_{init}$ is 10 and then reduced to 5, and the channel is determined to be busy, the BS senses the channel for the defer duration and determines whether the channel is idle. If the channel is idle for the defer duration, the BS may resume the CAP from a backoff counter value 5 (or from a backoff counter value 4 after decrementing the backoff counter value by 1).

On the other hand, if the channel is busy for the defer duration (N in S2170), the BS re-performs step S2160 to check again whether the channel is idle for a new defer duration.

In the above procedure, if the BS does not perform the transmission including the PDSCH/PDCCH/EPDCCH on the carrier on which a LAA SCell(s) transmission is performed after step 4, the BS may perform the transmission including the PDSCH/PDCCH/EPDCCH on the carrier, when the following conditions are satisfied:

When the BS is prepared to transmit the PDSCH/PDCCH/EPDCCH and the channel is sensed as idle for at least a slot duration $T_{sl}$, or for all slot durations of the defer duration $T_d$ immediately before the transmission; and On the contrary, when the BS does not sense the channel as idle for the slot duration $T_{sl}$ or for any of the slot durations of the defer duration $T_d$ immediately before the intended transmission, the BS proceeds to step 1 after sensing the channel as idle for a slot duration of the defer duration $T_d$.

The defer duration $T_d$ includes a duration of $T_f$ (=16us) immediately followed by $m_p$ consecutive slot durations where each slot duration $T_{sl}$ is 9us, and $T_f$ includes an idle slot duration $T_{sl}$ at the start of $T_f$.

If the BS senses the channel for the slot duration $T_{sl}$ and power detected by the BS for at least 4us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents a contention window. $CW_p$ adjustment will be described in section 2.2.3.

$CW_{min,p}$ and $CW_{max,p}$ are chosen before step 1 of the above procedure.

$m_p$, $CW_{min,p}$, and $CW_{max,p}$ are based on a channel access priority class associated with the transmission of the BS (see Table 13 below).

$X_{Thresh}$ is adjusted according to section 2.2.4.

TABLE 13

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the BS performs a discovery signal transmission which does not include a PDSCH/PDCCH/EPDCCH when N>0 in the above procedure, the BS does not decrement N for a slot duration overlapping with the discovery signal transmission.

The BS does not continuously perform transmissions on the channel, for a period exceeding $T_{mcot,p}$ as given in Table 13 on the carrier on which an LASS SCell transmission is performed.

For p=3 and p=4 in Table 13, if the absence of any other technology sharing the carrier may be guaranteed on a long term basis (e.g., by level of regulation), $T_{mcot,p}$=10 ms and otherwise, $T_{mcot,p}$=8 ms.

2.2.2. Channel Access Procedure for Transmissions Including Discovery Signal Transmission(S) and Not Including PDSCH If the transmission duration of the BS is 1 ms or less, the BS may perform a transmission including a discovery signal transmission without a PDSCH on a carrier on which a LAA SCell transmission is performed, immediately after a corresponding channel is sensed as idle for at least a sensing interval $T_{drs}$ (=25us). $T_{drs}$ includes a duration of $T_f$ (=16us) immediately followed by one slot duration $T_{sl}$ (=9us). $T_f$ includes an idle slot duration $T_{sl}$ at the start of $T_f$. If the channel is sensed as idle for the slot duration $T_{drs}$, the channel is considered to be idle for $T_{drs}$.

2.2.3. Contention Window Adjustment Procedure

If the BS performs a transmission including a PDSCH associated with a channel access priority class p on a carrier, the BS maintains and adjusts a contention window value $CW_p$ by using the following procedures before step 1 of the procedure described in section 2.2.1. for the transmission (i.e., before performing a CAP):

1> Set $CW_p=CW_{min,p}$ for all priority classes p ∈{1,2,3,4}.

2> If at least 80% (z=80%) of HARQ-ACK values corresponding to PDSCH transmission(s) in a reference subframe k are determined to be NACK, the BS increments $CW_p$ for all priority classes p ∈{1,2,3,4} to the next higher allowed value and remains in step 2. Otherwise, the BS goes to step 1.

In other words, when the probability that the HARQ-ACK values corresponding to the PDSCH transmission(s) in reference subframe k are determined to be NACK is at least 80%, the BS increments a CW value set for each priority class to the next higher value. Alternatively, the BS maintains the CW value set for each priority class to be an initial value.

Reference subframe k is the starting subframe of the most recent transmission on the carrier made by the BS, for which at least some HARQ-ACK feedback is expected to be available.

The BS adjusts the $CW_p$ values for all priority classes p ∈ {1,2,3,4} only once based on the given reference subframe k.

If $CW_p=CW_{max,p}$ the next higher allowed value for the $CW_p$ adjustment is $CW_{max,p}$.

The probability Z of determining HARQ-ACK values corresponding to PDSCH transmission(s) in reference subframe k to be NACK may be determined in consideration of the following.

If the transmission(s) of the BS for which HARQ-ACK feedback is available starts in the second slot of subframe k, HARQ-ACK values corresponding to PDSCH transmission(s) in subframe k and additionally, HARQ-ACK values corresponding to PDSCH transmission(s) in subframe k+1 are used.

If HARQ-ACK values correspond to PDSCH transmission(s) in the same LAA SCell allocated by an (E)PDCCH transmitted in LAA SCell, If an HARQ-ACK feedback for a PDSCH transmission of the BS is not detected or if the BS detects a'DTX', 'NACK/DTX' or (any) other state, it is counted as NACK.

If the HARQ-ACK values correspond to PDSCH transmission(s) in another LAA SCell allocated by an (E)PDCCH transmitted in the LAA SCell, If an HARQ-ACK feedback for a PDSCH transmission of the BS is detected, 'NACK/DTX' or (any) other state is counted as NACK and the 'DTX' state is ignored.

If an HARQ-ACK feedback for a PDSCH transmission of the BS is not detected,

If it is expected that the BS will use PUCCH format 1 with channel selection, the 'NACK/DTX' state corresponding to 'no transmission' is counted as NACK, and the 'DTX' state corresponding to 'no transmission' is ignored. Otherwise, the HARQ-ACK for the PDSCH transmission is ignored.

If the PDSCH transmission has two codewords, an HARQ-ACK value for each codeword is considered individually.

A bundled HARQ-ACK across M subframes is considered to be M HARQ-ACK responses.

If the BS performs a transmission which includes a PDCCH/EPDDCH with DCI format 0A/0B/4A/4B and does not include a PDSCH associated with the channel access priority class p on a channel starting from time $t_0$, the BS maintains and adjusts the competing window size $CW_p$ by using the following procedures before step 1 of the procedure described in section 2.2.1. for the transmission (i.e., before performing the CAP):

1> Set $CW_p=CW_{min,p}$ for all priority classes p ∈{1,2,3,4}.

2> If a UE using a type 2 CAP (described in section 2.3.1.2.) successfully receives less than 10% of UL transport blocks (TBs) scheduled by the BS during a time period $t_0$ and $t_0+T_{CO}$, the BS increments $CW_p$ for all priority classes to the next higher allowed value and remains in step 2. Otherwise, the BS goes to step 1.

$T_{CO}$ is calculated according to section 2.3.1.

If $CW_p=CW_{min,p}$ is used K times consecutively to generate $N_{init}$, only $CW_p$ for a priority class p for $CW_p=CW_{max,p}$ used K times consecutively to generate $N_{init}$ is reset to $CW_{min,p}$. the BS then selects K from a set of {1, 2, . . . , 8} values for each priority class p ∈ {1,2,3,4}

2.2.4. Energy Detection Threshold Adaptation Procedure

A BS accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the absence of any other technology sharing the carrier may be guaranteed on a long term basis (e.g., by level of regulation), $$X_{Thresh\_max} = \min\left\{ \begin{array}{l} T_{max} + 10 \text{ dB,} \\ X_r \end{array} \right\}$$

where $X_r$ is the maximum energy detection threshold (in dBm) defined in regulatory requirements, when the regulation is defined. Otherwise, $X_r = T_{max} + 10$ dB.

Else, $$X_{Thres\_max} = \max\left\{ \begin{array}{l} -72 + 10 \cdot \log10(BW\text{MHz}/20 \text{ MHz})\text{dBm,} \\ \min\left\{ \begin{array}{l} T_{max}, \\ T_{max} - T_A + (P_H + 10 \cdot \log10(BW\text{MHz}/20 \text{ MHz}) - P_{TX}) \end{array} \right\} \end{array} \right\}$$

Herein, each variable is defined as follows.

$T_A = 10$ dB for transmission(s) including PDSCH $T_A = 5$ dB for transmissions including discovery signal transmission(s) and not including PDSCH;

$P_H = 23$ dBm:

$P_{TX}$ is the set maximum eNB output power in dBm for the carrier;

eNB uses the set maximum transmission power over a single carrier irrespective of whether single carrier or multi-carrier transmission is employed $T_{max}$(dBm)=10·log 10(3.16228·10$^{-8}$ (mW/MHz)· BWMHz (MHz));

BWMHz is the single carrier bandwidth in MHz.

2.2.5. Channel Access Procedure for Transmission(S) on Multiple Carriers

The BS may access multiple carriers on which a LAA SCell transmission is performed in one of the following type A or type B procedures.

2.2.5.1. Type A Multi-Carrier Access Procedures

According to the procedure described in this section, the BS performs channel access on each carrier $c_i \in C$ where C is a set of intended carriers to be transmitted by the BS, i=0,1, ... q-1, and q is the number of carriers to be transmitted by the BS.

The counter N described in section 2.2.1 (i.e., the counter N considered in the CAP) is determined for each carrier $c_i$, and in this case, the counter for each carrier is represented as $N_{c_i}$. $N_{c_i}$ is maintained according to section 2.2.5.1.1. or section 2.2.5.1.2.

2.2.5.1.1. Type A1

The counter N described in section 2.2.1 (i.e., the counter N considered in the CAP) is determined for each carrier $c_i$, and the counter for each carrier is represented as $N_{c_i}$.

In the case where the BS ceases a transmission on one carrier $c_j \in C$, if the absence of any other technology sharing the carrier may be guaranteed on a long term basis (e.g., by level of regulation), the BS may resume $N_{c_i}$ reduction, when an idle slot is detected after waiting for a duration of 4·$T_{sl}$ or reinitializing $N_{c_i}$ for each carrier $c_i$ (where $c_i$ is different from $c_j$, $c_i \neq c_j$).

2.2.5.1.2. Type A2

The counter N for each carrier $c_j \in C$ may be determined according to section 2.2.1., and is denoted by $N_{c_j}$. Here, $c_j$ may mean a carrier having the largest $CW_p$ value. For each carrier $c_j$, $N_{c_j} = N_{c_j}$.

When the BS ceases a transmission on any one carrier for which $N_{c_j}$ has been determined by the BS, the BS reinitializes $N_{c_j}$ for all carriers.

2.2.5.2. Type B Multi-Carrier Access Procedure

A carrier $c_j \in C$ may be selected by the BS as follows.

The BS selects $c_j$ uniformly randomly from C before each transmission on multiple carriers $c_i \in C$, or The BS does not select $c_j$ more than once every one second.

Herein, C is a set of carriers to be transmitted by the BS, i=0,1, ... q-1, and q is the number of carriers to be transmitted by the BS.

For a transmission on a carrier $c_j$, the BS performs channel access on the carrier $c_j$ according to the procedure described in section 2.2.1 along with the modification described in section 2.2.5.2.1 or section 2.2.5.2.2.

For a transmission on the carrier $c_i$, $\neq c_j$ among the carriers $c_i \in C$, For each carrier $c_i$, the BS senses the carrier $c_i$ for at least a sensing interval $T_{mc} = 25$us immediately before the transmission on the carrier $c_i$. The BS may perform a transmission on the carrier $c_i$ immediately after sensing that the carrier $c_i$ is idle for at least the sensing interval $T_{mc}$. When the channel is sensed as idle during all time periods in which idle sensing is performed on the carrier $c_j$ within the given period $T_{mc}$, the carrier $c_i$ may be considered to be idle for $T_{mc}$.

The BS does not continuously perform transmissions on the carrier $c_i \neq c_j$, ($c_i \in C$) for a period exceeding $T_{mcot,p}$ as given in Table 6. $T_{mcot,p}$ is determined using the channel access parameter used for the carrier $c_j$.

2.2.5.2.1. Type B1

A single $CW_p$ value is maintained for the carrier set C.

To determine CWp for channel access on a carrier $c_j$, step 2 in the procedure described in section 2.2.3. is modified as follows.

If at least 80% (Z=80%) of HARQ-ACK values corresponding to PDSCH transmission(s) in reference subframe k of all carriers $c_i \in C$ are determined to be NACK, then $CW_p$ for all priority classes p $\in \{1,2,3,4\}$ is incremented to the next higher allowed value. Otherwise, the procedure goes to step 1.

2.2.5.2.2. Type B2 (Type B2)

The $CW_p$ value is maintained independently for each carrier $c_i \in C$ by using the procedure described in section 2.2.3. To determine $N_{init}$ for the carrier $c_j$ the $CW_p$ value of the carrier $c_{j1} \in C$ is used. Here, $c_{j1}$ is a carrier having the largest $CW_p$ among all carriers in the set C.

2.3. Uplink Channel Access Procedures

The UE and the BS that schedules a UL transmission for the UE perform the following procedure for access to a channel in which LAA SCell transmission(s) is performed. On the assumption that the UE and the BS are basically configured with a PCell that is a licensed band and one or more SCells which are unlicensed bands, a UL CAP operation applicable to the present disclosure will be described below in detail, with the unlicensed bands represented as LAA SCells. The UL CAP operation may be applied in the same manner even when only an unlicensed band is configured for the UE and the BS.

2.3.1. Channel Access Procedure for Uplink Transmission(s)

The UE may access a carrier on which LAA SCell UL transmission(s) are performed according to a type 1 or type 2 UL CAP. The type 1 CAP is described in section 2.3.1.1, and the type 2 CAP is described in section 2.3.1.2.

If a UL grant that schedules a PUSCH transmission indicates the type 1 CAP, the UE performs type 1 channel access to perform a transmission including the PUSCH transmission, unless otherwise stated in this section.

If the UL grant that schedules the PUSCH transmission indicates the type 2 CAP, the UE performs type 2 channel access to perform a transmission including the PUSCH transmission, unless otherwise stated in this section.

The UE performs type 1 channel access for an SRS transmission that does not include a PUSCH transmission. A UL channel access priority class p=1 is used for the SRS transmission that does not include a PUSCH.

TABLE 14

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it maybe increased to 8 ms by inserting one or more gaps. The minimum duration of a gap shall be 100 μs. The maximum duration before including any such gap shall be 6 ms.

When the 'UL configuration for LAA' field configures 'UL offset' l and 'UL duration' d for subframe n, If the end of a UE transmission occurs in or before subframe n+l+d−1, the UE may use the type 2 CAP for transmission in subframe n+l+i (where i=0,1, ... d−1).

If the UE is scheduled to perform a transmission including a PUSCH in a subframe set $n_0, n_1, \ldots, n_{w-1}$ by using PDCCH DCI format 0B/4B, and the UE may not perform channel access for transmission in subframe $n_k$, the UE should attempt to make a transmission in subframe $n_{k+1}$ according to a channel access type indicated by DCI. k ∈ {0,1, ... w−2} and w is the number of scheduled subframes indicated by the DCI.

If the UE is scheduled to perform a transmission including a PUSCH without gaps in the subframe set $n_0, n_1, \ldots, n_{w-1}$ by using one or more of PDCCH DCI formats 0A/0B/4A/4B, and performs a transmission in subframe $n_k$ after accessing a carrier according to the type 1 or type 2 CAP, the UE may continue the transmission in a subframe after $n_k$ where k∈ {0,1, ... w−1}.

If the start of the UE transmission in subframe n+1 immediately follows the end of the UE transmission in subframe n, the UE does not expect that a different channel access type will be indicated for the transmission in the subframe.

If the UE is scheduled to perform a transmission without gaps by using one or more of PDCCH DCI formats 0A/0B/4A/4B, stops the transmission during or before subframe $n_{k1}$ (where k1∈{0,1, ... w−2}), and continuously senses the corresponding channel as idle after stopping the transmission, the UE may perform the transmission in the type 2 CAP after subframe$_{k2}$ (where k2 ∈{1, ... w−1}). If the channel is not sensed continuously as idle by the UE after the UE stops the transmission, the UE may perform the transmission in the type 1 CAP of a UL channel access priority class indicated by DCI corresponding to subframe $n_{k2}$ after subframe $n_{k2}$ (where k2 ∈ {1, ... w−1}).

If the UE receives a UL grant, DCI indicates the UE to start a PUSCH transmission in subframe n by using the type 1 CAP, and the UE has an ongoing type 1 CAP before subframe n,
- If a UL channel access priority class value p1 used for the ongoing type 1 CAP is equal to or greater than a UL channel access priority class value p2 indicated by the DCI, the UE may perform the PUSCH transmission by accessing a carrier in the ongoing type 1 CAP.
- If the UL channel access priority class value p1 used for the ongoing type 1 CAP is less than the UL channel access priority class value p2 indicated by the DCI, the UE terminates the ongoing type 1 CAP.

If the UE is scheduled to transmit on a carrier set C in subframe n, a UL grant scheduling a PUSCH transmission on the carrier set C indicates the type 1 CAP, the same 'PUSCH starting position' is indicated for all carriers of the carrier set C, and the carrier frequencies of the carrier set C are a subset of a preset carrier frequency set,
- The UE may perform a transmission on a carrier $c_i \in C$ in the type 2 CAP.
- If the type 2 CAP has been performed on the carrier $c_i$ immediately before the UE transmission on a carrier $c_j \in C$, and
- If the UE has accessed the carrier $c_j$ by using the type 1 CAP,
- Before performing the type 1 CAP on any one carrier in the carrier set C, the UE uniformly randomly selects the carrier $c_j$ from the carrier set C.

When the BS has transmitted on the carrier according to the CAP described in section 2.2.1, the BS may indicate the type 2 CAP by DCI in a UL grant that schedules a transmission including a PUSCH on the carrier in subframe n.

Alternatively, when the BS has transmitted on the carrier according to the CAP described in section 2.2.1, the BS may indicate that the type 2 CAP is available for the transmission including the PUSCH on the carrier in subframe n by the 'UL Configuration for LAA' field.

Alternatively, when subframe n occurs within a time period starting from t0 and ending at $t_0+T_{CO}$, the BS may schedule the transmission including the PUSCH on the carrier within subframe n following a transmission of a duration short $T_{short\_ul}$=25us from the BS. $T_{CO}=T_{mcot,p}+T_g$ and each variable may be defined as follows.
- t0: a time instant at which the BS starts a transmission.
- $T_{mcot,p}$: determined by the BS according to section 2.2.
- $T_g$: the total period of all gap periods exceeding 25us occurring between a DL transmission of the BS starting from $t_0$ and a UL transmission scheduled by the BS and between two UL transmissions scheduled by the BS.

If the UL transmissions are scheduled in succession, the BS schedules the UL transmissions between consecutive subframes in $t_0$ and $t_0+T_{CO}$.

For the UL transmission on the carrier following the transmission of the BS on the carrier within the duration $T_{short\_ul}$=25us, the UE may perform the type 2 CAP for the UL transmission.

If the BS indicates the type 2 CAP for the UE by DCI, the BS indicates a channel access priority class used to obtain access to the channel in the DCI.

2.3.1.1. Type 1 UL Channel Access Procedure

After sensing that the channel is idle for a slot duration of a defer duration $T_d$ and the counter N becomes 0 in step 4, the UE may perform a transmission using the type 1 CAP. The counter N is adjusted by sensing the channel for additional slot duration(s) according to the following procedure.

1) Set $N=N_{init}$ where $N_{init}$ is a random number uniformly distributed between 0 and $CW_p$, and go to step 4.
2) If N>0 and the BS chooses to decrement the counter, set N=N−1.
3) Sense the channel for an additional slot duration, and if the additional slot duration is idle, go to step 4. Else, go to step 5.
4) If N=0, stop. Else, go to step 2.
5) Sense the channel during all slot durations of an additional defer duration $T_d$.
6) If the channel is sensed as idle during the slot durations of the additional defer duration $T_d$, go to step 4. Else, go to step 5.

The above-described type 1 UL CAP of the UE may be summarized as follows.

For a UL transmission, a transmission node (e.g., a UE) may initiate the CAP to operate in LAA SCell(s) which is an unlicensed band cell (S2110).

The UE may randomly select a backoff counter N within a CW according to step 1. N is set to an initial value $N_{init}$ (S2120). $N_{init}$ is a value selected randomly from among the values between 0 and $CW_p$.

Subsequently, if the backoff counter value N is 0 according to step 4 (Y in S2130), the UE ends the CAP (S2132). Subsequently, the UE may perform a Tx burst transmission (S2134). On the other hand, if the backoff counter value is not 0 (N in S2130), the UE decrements the backoff counter value by 1 according to step 2 (S2140).

Subsequently, the UE checks whether the channel of the LAA SCell(s) is idle (S2150). If the channel is idle (Y in S2150), the UE checks whether the backoff counter value is 0 (S2130).

On the contrary, if the channel is not idle in step S2150, that is, the channel is busy (N in S2150), the UE checks whether the channel is idle for a defer duration $T_d$ (25 usec or more) longer than a slot time (e.g., 9 usec) according to step 5 (S2160). If the channel is idle for the defer duration (Y in S2170), the UE may resume the CAP.

For example, if the backoff counter value $N_{init}$ is 10 and the channel is determined to be busy after the backoff counter value is decremented to 5, the UE determines whether the channel is idle by sensing the channel for the defer duration. In this case, if the channel is idle for the defer duration, the UE may perform the CAP again from the backoff counter value 5 (or from the backoff counter value 4 after decrementing the backoff counter value by 1), instead of setting the backoff counter value $N_{init}$.

On the other hand, if the channel is busy for the defer duration (N in S2170), the UE re-performs S2160 to check again whether the channel is idle for a new defer duration.

In the above procedure, if the UE does not perform the transmission including the PUSCH on the carrier in which LAA SCell transmission(s) is performed after step 4 of the afore-described procedure, the UE may perform the transmission including the PUSCH on the carrier, when the following conditions are satisfied:

When the UE is prepared to transmit the transmission including the PUSCH and the channel is sensed as idle during at least the slot duration $T_{sl}$; and When the channel is sensed as idle during all slot durations of the defer duration $T_d$ immediately before the transmission including the PUSCH.

On the contrary, when the UE senses the channel for the first time after being prepared for the transmission, if the channel is not sensed as idle during the slot duration $T_{sl}$, or during any of all slot durations of the defer duration $T_d$ immediately before the intended transmission including the PUSCH, the UE proceeds to step 1 after sensing the channel as idle during the slot durations of the defer duration $T_d$.

The defer duration $T_d$ includes a duration of $T_f$ (=16us) immediately followed by $m_p$ consecutive slot durations where each slot duration $T_{sl}$ is 9us, and $T_f$ includes an idle slot duration $T_{sl}$ at the start of $T_f$.

If the UE senses the channel during the slot duration $T_{sl}$ and power measured by the UE for at least 4us in the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \, CW_{max,p}$ represents a contention window, and $CW_p$ adjustment is described in detail in section 2.3.2.

$CW_{min,p}$ and $CW_{max,p}$ are chosen before step 1 of the above procedure.

$m_p$, $CW_{min,p}$, and $CW_{max,p}$ are determined based on a channel access priority class signaled to the UE (see Table 14 below).

$X^{Thresh}$ is adjusted according to section 2.3.3.

2.3.1.2. Type 2 UL Channel Access Procedure

If the UE uses the type 2 CAP for a transmission including a PUSCH, the UE may perform the transmission including the PUSCH immediately after sensing a channel as idle for at least a sensing duration $T_{short\_ul}$=25us. $T_{short\_ul}$ includes a duration of $T_f$ (=16us) immediately followed by one slot duration $T_{sl}$ (=9us). $T_f$ includes an idle slot duration $T_{sl}$ at the start of $T_f$. If the channel is sensed as idle during the slot duration $T_{short\_ul}$, the channel is considered to be idle for $T_{short\_ul}$.

2.3.2. Contention Window Adjustment Procedure

If the UE performs a transmission using the type 1 CAP associated with a channel access priority class p on a carrier, the UE maintains and adjusts a contention window value $CW_p$ using the following procedures before step 1 of the procedure described in section 2.3.1.1. for the transmission (i.e., before performing the CAP):

When a new data indicator (NDI) for at least one HARQ process related to HARQ_ID_ref is toggled, Set $CW_p = CW_{min,p}$ for all priority classes p∈ {1,2,3,4}.

Else, increment CWp to the next higher allowed value for all priority classes p∈ {1,2,3,4}.

HARQ_ID_ref is the HARQ process ID of a UL-SCH in reference subframe $n_{ref}$. Reference subframe $n_{ref}$ is determined as follows.

When the UE receives a UL grant in subframe $n_g$. Here, subframe $n_w$ is the most recent subframe before subframe $n_g$−3 in which the UE transmits the UL-SCH using the type 1 CAP.

If the UE performs a transmission including a UL-SCH without gaps, starting from subframe no in a subframe $n_0, n_1, \ldots, n_{w-1}$, reference subframe $n_{ref}$ is subframe $n_0$.

Else, reference subframe $n_{ref}$ is subframe $n_w$.

If the UE is scheduled to perform a transmission including a PUSCH without gaps in a subframe set $n_0, n_1, \ldots, n_{w-1}$ and may not perform any transmission including the PUSCH in the subframe set, the UE may maintain $CW_p$ for all priority classes p∈{1,2,3,4} without changing $CW_p$.

If a reference subframe for the recent scheduled transmission is also subframe $n_{ref}$, the UE may maintain $CW_p$ for all priority classes $p \in \{1,2,3,4\}$ equal to $CW_p$ for a transmission including a PUSCH, which uses the recent scheduled type 1 CAP.

If $CW_p = CW_{max,p}$, the next higher allowed value for the $CW_p$ adjustment is $CW_{max,p}$.

If $CW_p = CW_{max,p}$ is used K times consecutively to generate $N_{init}$, only $CW_p$ for a priority class p for $CW_p = CW_{max,p}$ used K times consecutively to generate $N_{init}$ is reset to $CW_{min,p}$. K is then selected by the UE from a set of $\{1, 2, \ldots, 8\}$ values for each priority class $p \in \{1,2,3,4\}$.

2.3.3. Energy Detection Threshold Adaptation Procedure)

A UE accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the UE is configured with a higher-layer parameter 'maxEnergyDetectionThreshold-r14', $X_{Thresh\_max}$ is set equal to a value signaled by the higher-layer parameter.

Else,

The UE determines $X'_{Thresh\_max}$ according to the procedure described in section 2.3.3.1.

If the UE is configured with a higher-layer parameter maxEnergyDetectionThresholdOffset-r14', $X_{Thresh\_max}$ is set to $X'_{Thresh\_max}$ adjusted according to an offset value signaled by the higher-layer parameter.

Else,

The UE sets $X_{Thresh\_max} = X'_{Thresh\_max}$.

2.3.3.1. Default Maximum Energy Detection Threshold Computation Procedure

If a higher-layer parameter 'ab senceOfAnyOtherTechnology-r14' indicates TRUE:

$$X'_{Thresh\_max} = \min\left\{ \begin{array}{l} T_{max} + 10 \text{ dB}, \\ X_r \end{array} \right\}$$

where Xr is a maximum energy detection threshold (in dBm) defined in regulatory requirements when the regulation is defined. Else, $X_r = T_{max} + 10$ dB Else:

$$X_{Thres\_max} = \max\left\{ \begin{array}{l} -72 + 10 \cdot \log 10(BW\text{MHz}/20 \text{ MHz})\text{dB}m, \\ \min\left\{ \begin{array}{l} T_{max}, \\ T_{max} - T_A + (P_H + 10 \cdot \log 10(BW\text{MHz}/20 \text{ MHz}) - P_{TX}) \end{array} \right\} \end{array} \right\}$$

Here, each variable is defined as follows.

$T_A = 10$ dB $P_H = 23$ dBm $P_{TX}$ is the set to the value of $P_{CMAX\_H}$, as defined in 3GPP TS 36.101

$T_{max}$(dBm)=10·log 10 (3.16228·10⁻⁸(mW/MHz)· BWMHz (MHz))

BWMHz is the single carrier bandwidth in MHz 2.4. Subframe/Slot Structure Applicable to Unlicensed Band System FIG. 22 illustrates a partial TTI or partial subframe/slot applicable to the present disclosure.

In the Release-13 LAA system, a partial TTI is defined as a DwPTS to maximize use of MCOT and support continuous transmission in a DL burst transmission. The partial TTI (or partial subframe) refers to a period in which a PDSCH signal is transmitted for a length smaller than a legacy TTI (e.g., 1 ms).

In the present disclosure, a starting partial TTI or a starting partial subframe/slot refers to a form in which some front symbols of a subframe are emptied, and an ending partial TTI or ending partial subframe/slot refers to a form in which some symbols at the end of a subframe are emptied. (On the other hand, a whole TTI is called a normal TTI or a full TTI.)

Figure 22:
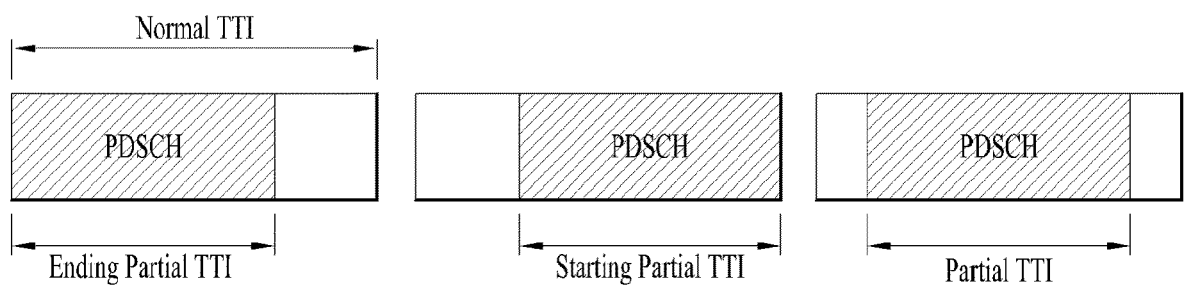
FIG. 22 is a diagram illustrating a partial transmission time interval (TTI) or a partial subframe/slot, which is applicable to the present disclosure.

FIG. 22 illustrates various forms of the above-described partial TTI. The first drawing of FIG. 22 illustrates the ending partial TTI (or subframe/slot), and the second drawing of FIG. 22 illustrates the starting partial TTI (or subframe/slot). In addition, the third drawing of FIG. 22 illustrates a partial TTI (or subframe/slot) configured by emptying some symbols at the start and end of the subframe/slot. In this case, a time interval excluding signal transmission in a normal TTI is called a transmission gap (TX gap).

While FIG. 22 has been described in the context of a DL operation, the same thing may be applied to a UL operation. For example, the partial TTI structures illustrated in FIG. 22 may also be applied to PUCCH and/or PUSCH transmission.

3. Proposed Embodiments

The configurations proposed by the present disclosure will be described in more detail based on the technical spirit as described above.

In the present disclosure, a method of transmitting a PUCCH or a PUSCH in an unlicensed band by a UE in a wireless communication system including BSs and UEs will be described in detail.

The NR system to which the present disclosure is applicable is designed to support a plurality of logical networks in a single physical system, and thus services (e.g., eMBB, mMTC, URLLC, and so on) having various requirements by changing a TTI and/or OFDM numerology (e.g., OFDM symbol duration and SCS). On the other hand, along with the rapid increase in data traffic due to the emergence of smart devices, a method of using an unlicensed band for cellular communication even in the 3GPP NR system is under consideration, like the LAA of the legacy 3GPP LTE system. However, unlike the LAA, an NR cell in an unlicensed band (hereinafter referred to as an NR U-cell) may support a standalone operation. Accordingly, the NR U-cell may support PUCCH and PUSCH transmissions of the UE.

According to regional regulations on an unlicensed band, there may be a constraint that when a node transmits a signal in the unlicensed band, the signal should occupy more than X % of a system bandwidth and/or there may be a power spectral density (PSD) constraint that a power magnitude for signal transmission for each 1-MHz band is limited to Y dBm. For example, according to the ETSI regulation, which is the European regulation, X and Y values in the above-described regulation may be X=80 and Y=10, respectively.

Therefore, when the UE transmits the PUCCH or PUSCH in the unlicensed band, the UE may transmit the PUCCH or PUSCH in a block-interleaved FDMA (B-IFDMA) structure in order to minimize the transmission power limitation of the regulation. The B-IFDMA structure is a structure in which when a total band is divided into a plurality of interlaces, a cluster is created with K REs (or RBs) which are contiguous on the frequency axis, and a plurality of clusters with a distance of L REs (or RBs) between every two clusters are constructed as one interlace. For example, when there are 100 RBs in a 20-MHz system band, the system band may be divided into 10 interlaces having a cluster size of 1 RB and an interval between clusters of 10 RBs.

In the present disclosure, for a PUCCH carrying UCI such as an HARQ-ACK or CSI for a PDSCH scheduled by a DL assignment, the following PUCCH formats may be defined according to the payload size and transmission duration (e.g., the number of PUCCH transmission symbols) of the UCI.

(1) PUCCH format 0
Supported UCI payload size: up to K bits (e.g., K=2)
Number of OFDM symbols included in a single PUCCH: from 1 to X symbols (e.g., X=2)
Transmission structure: Only a UCI signal without a DMRS is included, and the UE transmits a specific UCI state by selecting and transmitting one of a plurality of sequences.

(2) PUCCH format 1
Supported UCI payload size: up to K bits
Number of OFDM symbols constituting a single PUCCH: from Y to Z symbols (e.g., Y=4, Z=14)
Transmission structure: the DMRS and the UCI are configured/mapped in TDM in different symbols. The UCI is transmitted by multiplying a modulation (e.g., QPSK) symbol by a specific sequence. Since CSs/OCCs are applied to both the UCI and the DMRS, multiplexing between multiple UEs (in the same RB) may be supported.

(3) PUCCH format 2
Supported UCI payload size: more than K bits
Number of OFDM symbols constituting a single PUCCH: from 1 to X symbols
Transmission structure: the DMRS and the UCI are configured/mapped in FDM in the same symbol. Coded UCI bits may be subjected only to inverse fast Fourier transform (IFFT) without discrete Fourier transform (DFT) and then transmitted.

(4) PUCCH format 3
Supported UCI payload size: more than K bits
Number of OFDM symbols constituting a single PUCCH: from Y to Z symbols
Transmission structure: the DMRS and the UCI are configured/mapped in TDM in different symbols. Since DFT is applied to coded UCI bits, the coded UCI bits may be transmitted without multiplexing between a plurality of UEs.

(5) PUCCH format 4
Supported UCI payload size: more than K bits
Number of OFDM symbols constituting a single PUCCH: from Y to Z symbols
Transmission structure: the DMRS and the UCI are configured/mapped in TDM in different symbols. Coded UCI bits are subjected to DFT and the transmitted. An OCC is applied to the UCI at the front end of DFT and a CS (or interleaving frequency division multiplexing (IFDM) mapping) is applied to the DMTS. Therefore, multiplexing between a plurality of UEs may be supported.

Now, a detailed description will be given of a flexible OFDM numerology, a B-IFDMA structure in a U-band, and a method of transmitting a PUCCH and a PUSCH in a U-band in consideration of a CAP operation in an NR system to which the present disclosure is applicable.

In the following description, an RB is a resource allocation unit on the frequency axis. For example, one RB may be a unit including 12 contiguous REs or subcarriers on the frequency axis.

3.1 B-IFDMA-based UL Transmission Structure 3.1.1 B-IFDMA Structure Based on OFDM Numerology For a UL (e.g., PUCCH and/or PUSCH) transmission of the UE, a resource area may be allocated to the UE in units of an interlace based on a B-IFDMA structure with a cluster size of X RBs (or REs) and a cluster interval of Y RBs (or REs). According to the present disclosure, X and Y values may be configured as follows according to an OFDM numerology.

(1) X value
Opt. 1: (always) fixed to 1 RB
Opt. 2: set to a predetermined value for each combination of UL BWP and OFDM numerology
For example, for a 15-kHz SCS, a preset value $Y_{REF}$ for each UL BWP may be set to Y, and for a Z-kHz ($\neq$15-kHz) SCS, a value obtained by scaling $Y_{REF}$ for each UL BWP by 15/Z may be set to Y for the BWP. When $Y_{REF} \cdot 15/Z$ is not an integer, X may be set to X=1/K for a minimum integer K which makes $K \cdot Y_{REF} \cdot 15/Z$ an integer.

(2) Y value
Opt. 1: set to a predetermined value for each combination of UL BWP band and OFDM numerology
For example, for the 15-kHz SCS, a preset value $Y_{REF}$ for each UL BWP may be set to Y, and for a Z-kHz ($\neq$15-kHz) SCS, a value obtained by scaling $Y_{REF}$ for each UL BWP band, YREF by 15/Z may be set to Y for the BWP band. When $Y_{REF}$ 15/Z is not an integer, a value obtained by applying a rounding or flooring operation to the corresponding value may be set to Y.
Opt. 2: set to a minimum number of RBs (or REs) above 1 MHz
Opt. 3: configured by higher-layer signaling (for each UL BWP and/or OFDM numerology)
In this case, a default value for X may be configured. For example, X may be 1 RB.
Opt. 4: set to a predetermined value for each UL BWP band (i.e., independent of an OFDM numerology)

Figure 23:
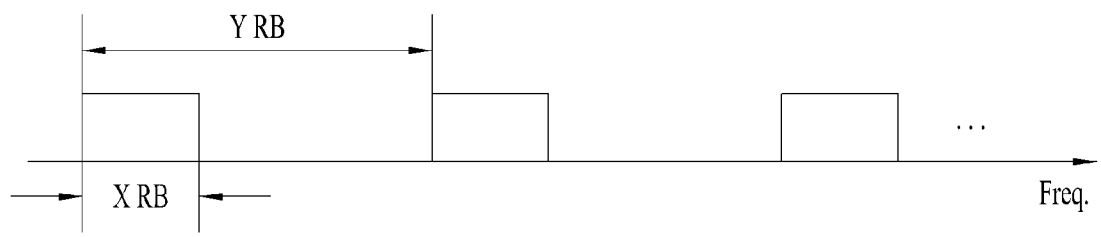
FIG. 23 is a diagram illustrating block interleaved frequency division multiple access (B-IFDMA) interlace(s) applicable to the present disclosure.

FIG. 23 is a schematic diagram illustrating interlace(s) in a B-IFDMA structure applicable to the present disclosure. In FIG. 23, interlace(s) with a cluster size of X RBs and a cluster interval of Y RBs (or REs) is illustrated.

In the present disclosure, the B-IFDMA structure is considered for signal transmission in an unlicensed band because there is a (regional) restriction that limits a maximum transmission power available per 1 MHz.

For example, it is assumed that for the 15-kHz SCS, the cluster size is 1 RB and the cluster interval is set to Y RBs (i.e., X=1 and Y=10 in FIG. 23). In this case, when the number of subcarriers in one RB is 12, 10 RBs, which is the frequency-axis interval between the clusters, is 10*12*15/1000=1.8 MHz larger than 1 MHz. Thus, it is possible to independently allocate transmission power to different clusters, for signal transmission. The maximum transmission power available to the UE increases in proportion to the number of clusters. Accordingly, the smallest integer greater than 1 MHz may be selected as the frequency-axis interval Y (RBs) between clusters in the B-IFDMA structure.

The NR system to which the present disclosure is applicable may support one or more OFDM numerologies, and as the SCS is changed, a frequency-axis interval corresponding to one RB may be changed. For example, it is assumed that for an SCS of 30 kHz, Y is set to 10, the same value as for the SCS of 15 kHz. In this case, the frequency-axis cluster interval, 10 RBs is 10*12*30/1000=3.2 MHz, which is excessively larger than 1 MHz. Accordingly, even though Y=5 RBs for the 30-kHz SCS, the cluster interval is 1.8 MHz, still greater than 1 MHz, thereby ensuring independent transmission power allocation between different clusters and, at the same time, doubling the number of clusters in the system band, compared to the case in which Y=10. As such, there may be an interval between clusters, which imposes a less constraint in terms of transmission power of the UE for each OFDM numerology.

Accordingly, a method of applying/configuring a different cluster size and interval for an interlace in a B-IFDMA structure according to an OFDM numerology, and a method of transmitting and receiving a UL signal in an unlicensed band based on the method according to the present disclosure will be described in detail.

For this purpose, for the 15-kHz SCS, a predetermined value $Y_{REF}$ for each UL BWP band is set to Y, whereas for a Z-kHz (≠15-kHz) SCS, a value obtained by scaling $Y_{REF}$ by 15/Z for each UL BWP band may be set to Y.

Alternatively, the interval Y RBs (or REs) between clusters may be set to a minimum number of RBs exceeding 1 MHz according to an OFDM numerology, or the BS may directly configure Y RBs by higher-layer signaling.

Alternatively, the following B-IFDMA structure may be applied to transmit/receive UL signals (e.g., PUCCH, PUSCH, etc.) in an unlicensed band as proposed by the present disclosure.

Considering PSD-related regulations and an occupied channel bandwidth, a PUSCH for NR-U may be designed based on multi-cluster transmission, similarly to an eLAA PUSCH. The NR system to which the present disclosure is applicable supports a variable SCS and BWP operation, and the cluster size and/or interval between clusters for a UL channel may be configured/determined based on a numerology and a bandwidth. An operating BW including M RBs is composed of N interlaces, and each interlace may be configured as illustrated in FIG. 24.

Figure 24:
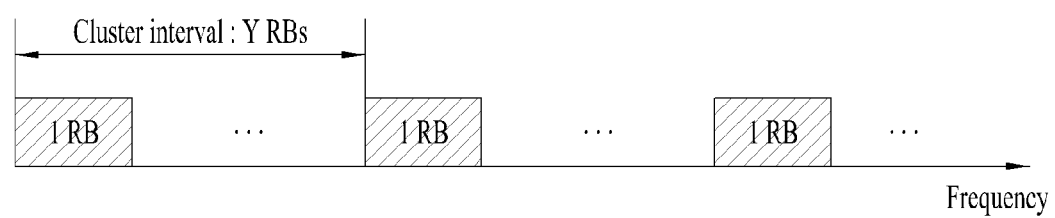
FIG. 24 is a diagram illustrating block interleaved frequency division multiple access (B-IFDMA) interlace(s) applicable to the present disclosure.

FIG. 24 is a schematic diagram illustrating interlace(s) in a B-IFDMA structure applicable to the present disclosure. In FIG. 24, an interlace is illustrated, which includes a group of multiple clusters having a cluster size of X RBs (e.g., X=1), a cluster interval of Y RBs (Y=N if X=1), and K RBs as a maximum/minimum number of RBs in one interlace.

According to the variable M, the following methods may be considered for configuring an interlace.

1> Method 1

When at least 10 RBs are included in one interlace (i.e., K=10), N is set to Floor{M/K}, and each of the (M−N*K) RBs is assigned to a distinct interlace. For example, if the operating bandwidth (i.e., system bandwidth) is 106 RBs (M=106) and K=10, 10 interlaces with 6 interlaces having 11 RBs and 4 interlaces having 10 RBs may be defined.

2> Method 2

When up to 10 RBs are included in one interlace (i.e., K=10), N is set to Ceiling{M/K}, and each of the (M−N*K) RBs in each interlace is subtracted from each interlace. For example, if the operating bandwidth (i.e., system bandwidth) is 106 RBs (M=106) and K=10, 11 interlaces with 7 interlaces having 10 RBs and 4 interlaces having 9 RBs may be defined.

Figure 25:
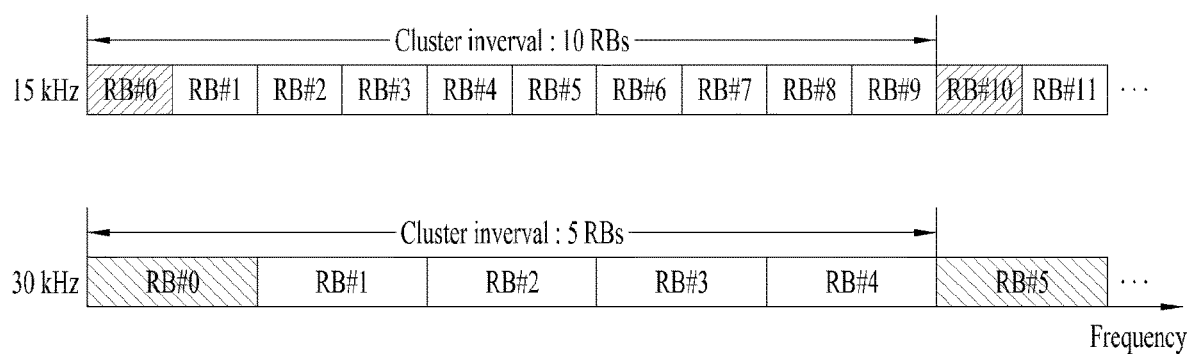
FIG. 25 is a diagram illustrating a subcarrier spacing (SPS)-based interlace configuration applicable to the present disclosure.

FIG. 25 is a diagram illustrating exemplary interlace configurations based on SCSs, which are applicable to the present invention.

Additionally, an SCS-based (or SCS-dependent) interlace structure may be considered. More specifically, the cluster size (X RBs) and/or cluster interval (Y RBs) may be determined in proportion to the ratio between an SCS for a PUSCH and a reference SCS (e.g., 15 kHz). For example, as illustrated in FIG. 25, the cluster interval for the 30-kHz SCS may be set to a half of the cluster interval for the 15-kHz SCS, while maintaining the cluster size.

Additionally, for a UL (e.g., PUCCH and/or PUSCH) transmission of the UE, a resource area may be allocated to the UE in units of an interlace based on a B-IFDMA structure in which the cluster size is X RBs (or REs), and the cluster interval is Y RBs (or REs). In this case, when each cluster is a resource unit (hereinafter, referred to as sub-PRB) including fewer REs (contiguous on the frequency axis) than one PRB, scaling may be applied by the ratio of the number of REs in a sub-PRB to the number of REs in a PRB for an MCS and/or a transport block size (TBS) indicated to the UE by the BS. In a specific example, when the number of REs in the sub-PRB is N and the number of REs in one PRB is 12, the UE may perform a signal transmission in the sub-PRB-based interlace(s) by applying floor(N/12) or ceil(N/12) to the TBS indicated by the BS.

In addition, when the UE transmits a PUSCH in one or more interlaces based on the B-IFDMA structure after applying DFT precoding, the total number of REs carrying the PUSCH may not be a multiple of 2/3/5. In this case, the UE may apply DFT precoding in units of a cluster group such that the number of REs in the cluster group in the PUSCH is a multiple of 2/3/5. For example, it is assumed that a cluster is 1 RB, and one interlace allocated for the PUSCH includes 11 clusters based on the B-IFDMA structure for the PUSCH. In this case, the UE may perform signal transmission by applying DFT precoding respectively to the front five clusters (cluster group 1) and the rear six clusters (cluster group 2) (on the frequency axis).

Further, for a UL (e.g., PUCCH and/or PUSCH) transmission of the UE, a resource area may be allocated to the UE in units of an interlace based on a B-IFDMA structure in which the cluster size is X RBs (or REs), and the cluster interval is Y RBs (or REs). In this case, even though the frequency band in which the UE actually performs a UL transmission is A MHz, the UE may perform the signal transmission by applying the B-IFDMA structure for each B-MHz unit (B<A). For example, when A=100 and B=20, the UE may perform a PUSCH transmission based on a B-IFDMA structure distinguished on a band basis for all five 20-MHz bands. In other words, an interlace resource for a plurality of bands may be defined by aggregating multiple interlace resources for (specific) unit bands, and the UE may transmit a signal in resources of an unlicensed band determined based on the defined interlace resource.

Further, for a UL (e.g., PUCCH and/or PUSCH) transmission of the UE, a resource area may be allocated to the UE in units of an interlace based on a B-IFDMA structure in which the cluster size is X RBs (or REs), and the cluster interval is Y RBs (or REs). A (frequency-axis) density for a PT-RS transmission may be defined relative to the cluster size. That is, it may be configured that one PT-RS transmission exists for every K clusters.

Further, for a UL (e.g., PUCCH and/or PUSCH) transmission of the UE, a resource area may be allocated to the UE in units of an interlace based on a B-IFDMA structure in which the cluster size is X RBs (or REs), and the cluster interval is Y RBs (or REs). The total number of REs carrying the PUSCH/PUCCH is may not be a multiple of 2/3/5. In this case, depending on whether the UE performs DFT precoding on the PUSCH/PUCCH, the actual number of REs/RBs carrying the PUSCH/PUCCH may vary (compared to the number of allocated REs/RBs).

For example, for the PUSCH, the BS may indicate to the UE whether DFT precoding is performed by RRC signaling or DCI. When the UE transmits a PUSCH for which DFT precoding has been configured/indicated, if the number of RBs belonging to an interlace allocated for the PUSCH is 11, the UE may transmit the PUSCH in only as many (i.e., 10) RBs as the largest multiple of 2/3/5 less than 11. A method of selecting 10 RBs for transmitting the actual PUSCH from among the allocated 11 RBs may be predefined or configured by RRC signaling. For example, one RB having a lowest (or highest) RB index (the RB index may be set differently according to a symbol and/or slot index) may be selected as an RB that does not carry a signal among the 11 RBs.

Herein, the UE may configure a PUSCH across 11 RB areas and then transmit the PUSCH by puncturing or rate-matching 1 RB. Alternatively, the UE may configure a PUSCH across 10 RB areas and then transmit the PUSCH by rate-matching 1 RB.

On the contrary, when the UE transmits a PUSCH for which DFT precoding has not been configured/indicated, if the number of RBs belonging to the interlace allocated for the PUSCH is 11, the UE may transmit the PUSCH in the 11 RBs.

The above-described operation may be applied in combination with the foregoing other operations of the present disclosure, unless conflicting with each other.

3.1.2 B-IFDMA and Sequence-Based PUCCH Transmission Structure

It is assumed that the cluster size is X RBs, and a single sequence is transmitted in each cluster. When the UE configures a (sequence-based) PUCCH in an interlace including N clusters having a cluster interval of Y RBs (or REs), the UE may transmit UCI on the (sequence-based) PUCCH of the interlace structure, as follows.

(1) Opt. 1: Repeated transmission of UCI in each cluster
  Opt. 1-1: A (single) $\log_2(L)$-bit UCI is represented as one ($CS_{REF}$) of L CSs for a specific (base) sequence. Accordingly, the UE transmits a sequence derived by applying a CS offset value (configured for each cluster) to $CS_{REF}$ on a cluster basis.
    However, the CS offset combination for the plurality of clusters may be selected to satisfy a low peak to average power ratio (PAPR) (or low cubic metric (CM)) characteristic in an OFDM symbol.
  Opt. 1-2: A (single) $\log_2(L)$-bit UCI is represented as an L-PSK modulation symbol (hereinafter, referred to as $M_{UCI}$). Accordingly, the UE transmits a sequence derived by multiplying the $M_{UCI}$ by a specific sequence, for each cluster.

(2) Opt. 2: Independent UCI transmission in each cluster
  Opt. 2-1: for n=1, 2, ..., N, $\log_2(L)$-bit UCI(n) for each $n^{th}$ cluster is represented as one (hereinafter, referred to as $CS_{REF}(n)$) of L CSs for a specific (base) sequence. Accordingly, the UE transmits a sequence derived by applying a CS offset value (configured for the cluster) to $CS_{REF}(n)$, for each $n^{th}$ cluster.
  Opt. 2-2: For n=1, 2, ..., N, $\log_2(L)$-bit UCI(n) is represented as an L-PSK modulation symbol (hereinafter, referred to as $M_{UCI}(n)$), for each $n^{th}$ cluster. Accordingly, the UE transmits a sequence derived by multiplying $M_{UCI}(n)$ by a specific sequence for each $n^{th}$ cluster.

(3) Opt. 3: Part of coded UCI bits are transmitted on a cluster basis
  Opt. 3-1: For n=1, 2, ..., N, $\log_2(L)$ bits of (partial) coded UCI bits is represented as one (hereafter, referred to as $CS_{REF}(n)$) of L CSs for a specific (base) sequence, for each $n^{th}$ cluster. Accordingly, the UE transmits a sequence derived by applying a CS offset value (set for the cluster) to $CS_{REF}(n)$, for each $n^{th}$ cluster.
  Opt. 3-2: For n=1, 2, ..., N, $\log_2(L)$ bits of (partial) coded UCI bits is represented as an L-PSK modulation symbol (hereafter, referred to as $M_{UCI}(n)$), for each $n^{th}$ cluster. Accordingly, the UE transmits a sequence derived by multiplying $M_{UCI}(n)$ by a specific sequence, for each $n^{th}$ cluster.

In Opt. 2, the entire UCI of $N \cdot \log_2(L)$ bits may be transmitted in the entire N clusters.

In Opt. 3, all $N \cdot \log_2(L)$ coded bits may be transmitted in all N clusters, and a maximum UCI payload size may be $N \cdot \log_2(L)$ bits. If a (maximum) coding rate, $C_{MAX}$ is preset or configured by higher-layer signaling (e.g. RRC signaling or the like), the actual UCI payload size may be calculated based on the product between the maximum UCI payload size (e.g., $N \cdot \log_2(L)$) and the (maximum) coding rate (e.g., $C_{MAX} \cdot N \cdot \log_2(L)$ bits).

The (frequency-axis) starting position and ending position of the interlace and/or the number N of clusters in the interlace may be determined based on (frequency axis) PUCCH transmission resource information configured for/assigned to the UE by the BS.

The BS may request/trigger a UCI transmission which uses one or more interlaces to the UE. In response to the request/trigger, the UE may transmit UCI or (partial) UCI or (partial) coded UCI bits to the BS according to one of Opt. 1/2/3. Alternatively, if a plurality of (K) allocated interlaces are contiguous (for example, K=2 and interlace indexes 0 and 1), the UE may transmit UCI according to one of Opt. 1/2/3, regarding one cluster size as K consecutive clusters.

Figure 26:
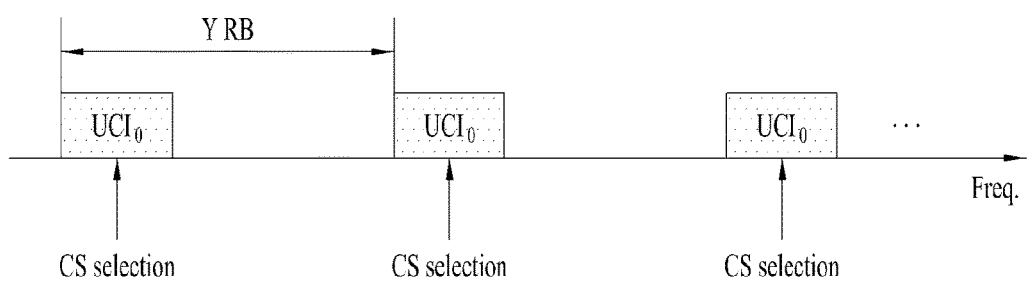
FIG. 26 is a diagram illustrating repeated transmissions of the same uplink control information (UCI) in each cluster according to the present disclosure.
Figure 27:
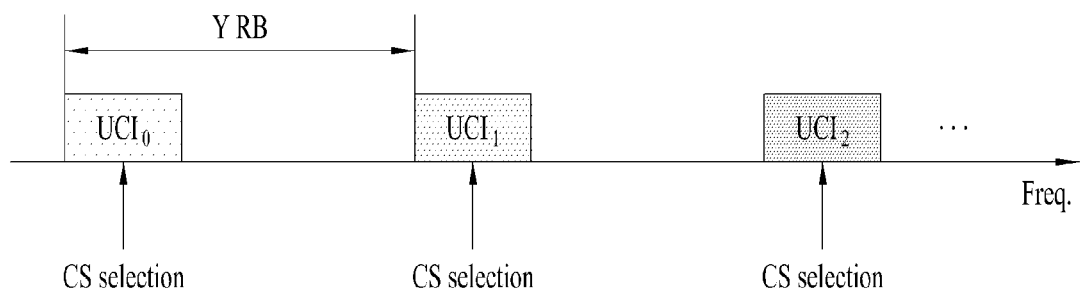
FIG. 27 is a diagram illustrating transmission of different UCI in each cluster, based on a sequence selection or sequence modulation scheme according to the present disclosure.

FIG. 26 is a diagram illustrating a structure in which the same UCI is repeatedly transmitted in each cluster according to the present disclosure, and FIG. 27 is a diagram illustrating a structure in which different UCI is transmitted in each cluster based on sequence selection or sequence modulation according to the present disclosure.

More specifically, in the NR system applicable to the present disclosure, when the UE performs sequence-based UCI transmission in the unlicensed band based on PUCCH Format 0 or PUCCH Format 1, the sequence-based PUCCH transmission structure may also be based on the B-IFDMA structure (to avoid transmission power constraints imposed by PSD regulations).

In this case, in the B-IFDMA transmission structure for the sequence-based PUCCH transmission, each cluster corresponds to a sequence to be transmitted, and the interval between clusters may be set equally or irregularly by a certain frequency resource size. Information transmitted by each cluster may be the same UCI, different UCI, or part of coded UCI bit(s). The way information is represented in each cluster may be one of sequence selection (i.e., a specific (information) state is transmitted by selecting/transmitting one of a plurality of specific sequences) and sequence modulation (i.e., a specific (information) state is transmitted by multiplying a (e.g., QPSK) modulation symbol by a specific sequence).

Additionally, it is assumed that the UE configures a (sequence-based) PUCCH with an interlace including N clusters each carrying a (single) sequence, with a cluster size of X RBs and a cluster interval of Y RBs (or REs). Now, a method of representing K UCI states by K CS (or sequence) combinations available for transmission in the N clusters, for the (sequence-based) PUCCH of the interlace structure will be described in detail.

For example, when N=6 and K=4, the (sequence-based) PUCCH resources may include six sequences generated by applying different CS values to the same base sequence. In this case, CS combinations A, B, C, and D, which are distinguished from each other, may represent UCI bits '00', '01', '10', and '11', respectively, and each CS combination represents a combination of six CS values. Further, even though CS combinations are distinguished from each other, CS values for some clusters may be configured to be equal.

Additionally, for a PUCCH transmission of the UE, it is assumed that resources are allocated in units of an interlace in a B-IFDMA structure in which the cluster size is X RBs (or REs) and the cluster interval is Y RBs (or REs). When each cluster is a resource unit (hereinafter, referred to as sub-PRB) including fewer REs (contiguous on the frequency axis) than one PRB, and the transmission structure of the (B-IFDMA based) PUCCH is PUCCH format 0/1/3/4, the UE may generate a (DMRS or UCI) sequence in the corresponding PUCCH resources in one or more of the following methods.

1) Generate sequence for each cluster
   That is, a sequence length may be equal to the number of REs in a cluster.
2) Generate sequence for a plurality of clusters
   That is, a sequence length may be equal to the number of REs in the plurality of clusters.

In a specific example, it is assumed that the PUCCH to be transmitted by the UE follows the structure of PUCCH format 0 and 6 REs form one cluster. In this case, the UE may generate a length-6 sequence and represent a 1-bit or 2-bit HARQ-ACK based on two CSs out of CSs with indexes {0, 1, 2, 3, 4, 5}, or the UE may generate a length-12 sequence by grouping two clusters, and represent a 1-bit or 2-bit HARQ-ACK based on two CSs out of CSs with indexes {0, 1, 2, 3, 4, 5, 6, 7, 8, 9, 10, 11}.

In addition, for a PUCCH transmission of the UE, it is assumed that resources are allocated to the UE in units of an interlace in a B-IFDMA structure in which the cluster size is X RBs (or REs) and the cluster interval is Y RBs (or REs). In this case, even though the UE is allocated a plurality of interlace(s) as PUCCH resources, the UE may (adaptively) use only a part of the plurality of interlaces for the actual PUCCH transmission according to the size of UCI payload to be transmitted. More specifically, the UE may transmit UCI in a minimum number of interlaces (or in one or more clusters included in the interlaces) including more resources (i.e., resources enough to fully transmit the UCI payload) than minimum required resources calculated by a function based on the UCI payload size to be transmitted and a (configured) maximum coding rate for UCI bits among interlace resources allocated by the BS.

Additionally, for a PUCCH transmission of the UE, it is assumed that resources are allocated in units of an interlace in a B-IFDMA structure in which the cluster size is X RBs (or REs) and the cluster interval is Y RBs (or REs). In this case, the UE may design a (DM-RS or UCI) sequence length/generation and CDM structure, using a single interlace and one or more clusters belonging to the interlace as a basic unit. Even though a plurality of interlaces are used for the PUCCH transmission, the (DM-RS or UCI) sequence length/generation and CDM structure may be limited to the design in the basic unit. Alternatively, according to the number of interlaces allocated for a PUSCH transmission, a unit for designing a (DM-RS or UCI) sequence length/generation and CDM structure may be differently set.

The above-described operation may be performed in combination with the foregoing other operations of the present disclosure, unless conflicting with each other. In other words, the above-described operation may be performed by applying the above-described 3.1. B-IFDMA-based UL Transmission Structure according to an embodiment.

3.2 UL Transmission Structure Considering CAP (or LBT) Operation 3.2.1 Symbol Group-Based Puncturing When the UE performs a PUCCH (or PUSCH) transmission in an unlicensed band, some (OFDM) symbols at the start of the PUCCH (or PUSCH) may be punctured (or rate-matched) for transmission, according to a channel access delay involved in a CAP operation. In this case, the (OFDM) symbols punctured by the UE may be determined as follows.

The PUCCH (or PUSCH) is divided into a plurality of symbol groups and puncturing is performed on a symbol group basis when channel access is delayed due to a CAP operation. Each symbol group may include at least one DMRS. Alternatively, a symbol group may be a unit in which frequency hopping is performed.

The UE may perform the PUCCH (or PUSCH) transmission from the starting boundary of the earliest symbol group after channel access success according to the CAP operation. (i.e., the symbol group(s) before the time boundary is punctured.)

When an OCC or a CSC is applied to the PUCCH (or PUSCH) to which puncturing has been applied, a (dedicated) OCC/CS combination value that matches the length of the PUCCH (or PUSCH) to which puncturing has been applied may be applied. That is, the OCC/CS combination may be different for puncturing and non-puncturing cases.

Figure 28:
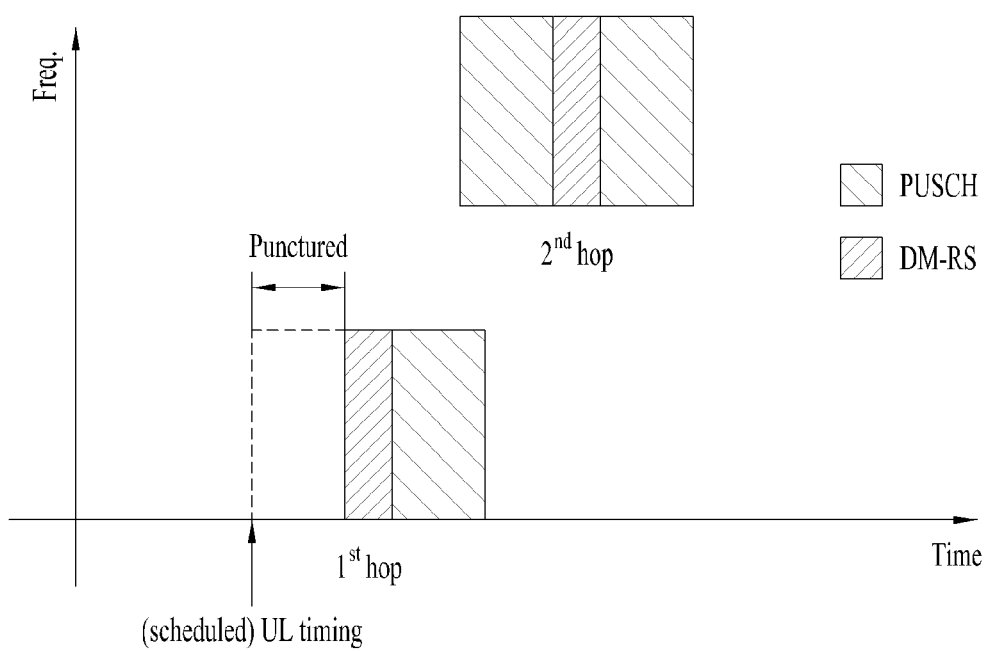
FIG. 28 is a schematic diagram illustrating transmission of a physical uplink shared channel (PUSCH) with some symbols punctured due to a channel access delay caused by a CAP operation of a user equipment (UE) according to an example of the present disclosure.

FIG. 28 is a diagram illustrating a configuration of transmitting a PUSCH with some symbols punctured due to a channel access delay caused by a CAP operation of a UE according to an example of the present disclosure.

In the case where the UE starts a PUCCH (or PUSCH) transmission L symbols after a time point indicated by the BS due to a channel access delay caused by a CAP operation, the UE may transmit the PUCCH (or PUSCH) by puncturing OFDM symbols which were not transmitted in the PUSCH (or PUSCH) to the BS in an unlicensed band, as illustrated in FIG. 28.

However, when puncturing is performed on arbitrary symbols according to the CAP result of the UE as described above, it may be difficult for the BS to determine which OFDM symbols the UE has punctured.

Figure 29:
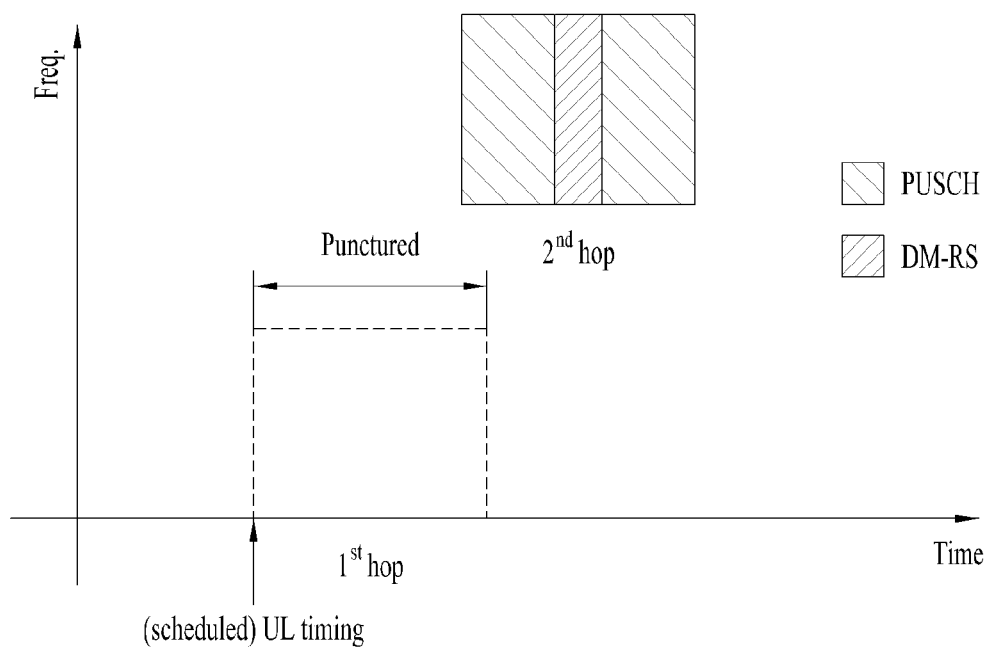
FIG. 29 is a schematic diagram illustrating transmission of a PUSCH with some symbols punctured due to a channel access delay caused by a CAP operation of a UE according to another example of the present disclosure.

FIG. 29 is a diagram illustrating a configuration of transmitting a PUSCH with some symbols punctured due to a channel access delay caused by a CAP operation of a UE according to another example of the present disclosure.

To solve the above-described problem, when the UE performs puncturing for a PUCCH (or PUSCH) due to a channel access delay caused by a CAP operation, the PUCCH (or PUSCH) may be divided into a plurality of symbol groups each including at least one DMRS, and an operation of performing puncturing on a symbol group basis by a UE may be considered. However, in the case of a PUCCH (or PUSCH) including only one DMRS symbol, the above punctured transmission may not be allowed.

According to the above operation, the BS may detect symbol groups which have been transmitted by DMRS detection, with a relatively high reliability. For example, if one DMRS (symbol) is present for each frequency hop of each PUSCH in FIG. 28, the UE may transmit a punctured PUSCH for the entire earlier frequency hop to the BS in an unlicensed band as illustrated in FIG. 29.

Additionally, when a time-axis OCC is applied to the PUCCH (or PUSCH), the OCC may be designed to have an OCC length smaller than or equal to a symbol group unit in which puncturing is to be performed according to a CAP operation of a UE.

Alternatively, a frequency-axis OCC, instead of a time-axis OCC, may be applied to the PUCCH (or PUSCH). In this case, the degree of freedom of a puncturing operation of the UE may be higher than when the time-axis OCC is applied to the PUCCH or the PUSCH. That is, in the case where the frequency-axis OCC is applied to the PUCCH (or PUSCH), when puncturing is performed in view of the CAP operation, the UE may perform puncturing on a symbol basis, not on a specific symbol group basis. (However, in this case, the minimum DMRS may be configured to be included in the PUCCH (or PUSCH)).

Additionally, when the puncturing operation caused by the CAP operation is applied to the PUSCH as described above, and the UE performs UCI piggyback on the PUSCH, a UCI mapping order may be set to the order of last to first symbol of the PUSCH. Alternatively, when UCI is piggybacked to the PUSCH, the UE may map the UCI first to an (OFDM) symbol in a latter part of the PUSCH in the time domain. Thus, it may be configured that (potential) puncturing of systematic bits caused by the CAP operation is not performed if possible.

Additionally, it is assumed that the starting symbol and ending symbol (of a PUSCH or PUCCH transmission) has been indicated as time-axis resource allocation information for a PUSCH (or PUCCH), and the PUSCH (or PUCCH) transmission across a plurality of slots has been indicated. In this case, the UE may assume that the starting symbol refers to the starting symbol of the first of a plurality of slots, and the ending symbol refers to the ending symbol of the last of the plurality of slots. In this case, the UE may assume that the PUSCH (or PUCCH) transmission resources from the starting time to the ending time are continuous.

The ending time may be indicated by the combination of an indicator indicating the starting time and an indicator indicating a length. For example, when the starting time is symbol index 3 and the length is 4 symbols, the ending time may be symbol index 7.

In addition, it is assumed that when a UE transmits a PUSCH, the UE may divide one TB into a plurality of code block groups (CBGs) and perform initial transmission and retransmission in units of a CBG. When the transmission of the PUSCH over a plurality of slots is indicated, the BS may indicate to the UE whether the transmission is an initial transmission or a retransmission, on a CBG basis in the plurality of slots in one or more of the following methods.

(1) The BS may indicate to the UE whether an initial transmission or a retransmission is performed by (or based on) a common CBG transmission indicator (CBGTI) field (for a plurality of slots) and a slot-specific NDI field in PUSCH-scheduling DCI (for the plurality of slots).

In a specific example, when (up to) N CBGs are configured per slot, the BS may indicate to the UE whether (re)transmission is performed in each of N CBGs in one slot by an N-bit CBGTI in the PUSCH scheduling DCI. The CBGTI may be applied only to a slot for which retransmission of a TB in the slot is indicated by a slot-specific NDI (total K-bit NDI) field, and may not be applied to a slot for which an initial transmission is indicated.

(2) For each CBG in a plurality of slots, the BS may indicate an initial transmission or a retransmission to the UE by (or based on) a common CBGTI field (for a plurality of slots) and a field (distinct from an NDI) indicating a slot to which a CBGTI is applied, in PUSCH scheduling DCI (for the plurality of slots).

In a specific example, when (up to) N CBGs are configured per slot, the BS may indicate whether (re)transmission is performed, for each of the N CBGs in one slot by an N-bit CBGTI in PUSCH scheduling DCI for the K slots. In addition, the BS may indicate, to the UE, slots to which the CBGTI is applied by a separate field in the DCI. In this case, the CBGTI may not be applied to slots which are not indicated by the separate field.

In the above description, the CBGTI may be a field in DCI, indicating whether a transmission is performed, for each CBG in a (specific) slot.

In the foregoing description, the NDI may be a field in the DCI, indicating an initial transmission or a retransmission for a TB in a (specific) slot.

The above-described operation may be performed in combination with the foregoing other operations of the present disclosure, unless conflicting with each other.

3.2.2 Floating Slot-Based PUCCH (or PUSCH) Transmission

When the UE performs a PUCCH (or PUSCH) transmission, the UE may transmit a PUCCH (or PUSCH) by delaying the starting time of the PUCCH (or PUSCH) according to a channel access delay caused by a CAP operation. The UE may perform a complete PUCCH (or PUSCH) transmission (scheduled by the BS) from the starting time of the PUCCH (or PUSCH) delayed by the CAP operation.

The delayed PUCCH (or PUSCH) transmission of the UE may be delayed to a range which does not exceed a slot boundary (of the next slot), Alternatively, when the duration of the PUCCH transmission is relatively short (e.g., a length of one or two symbols), the PUCCH transmission may be delayed to the range that does not exceed the ending slot boundary of a transmission slot (or this delay operation may be allowed).

More specifically, when the UE fails to start the PUCCH (or PUSCH0 transmission at a transmission time scheduled by the BS in view of the CAP-caused channel access delay, the UE may transmit the remaining PUSCH symbol(s) except for some punctured OFDM symbol(s) of the PUSCH by aligning them with a predetermined slot boundary, as described in section 3.2.1, or transmit the complete PUCCH (or PUSCH) scheduled by the BS, starting from a time at which channel access is successful after the CAP operation of the UE.

For example, it is assumed that a PUCCH (or PUSCH) includes 14 OFDM symbols, and the BS schedules/indicates the UE to start transmitting the PUCCH (or PUSCH) in symbol 0 of a scheduled slot. Herein, the UE may actually start transmitting the PUCCH (or PUSCH) in symbol 5 due to a CAP operation-caused delay (e.g., although the UE has performed the CAP operation in symbol 0, the UE has failed in the CAP at the time).

In the above case, the UE may start transmitting the PUCCH (or PUSCH) of the length of 14 OFDM symbols in symbol 5. That is, the UE may transmit the PUCCH (or PUSCH), considering that there is a virtual slot boundary varying according to the time of CAP success.

Unless conflicting with each other, the above operation may be performed in combination with the foregoing other operations of the present disclosure.

3.2.3 Multiple TX Opportunity-Based PUCCH (or PUSCH) Transmission

The BS may indicate the following information about a PUCCH (or PUSCH) to the UE by DCI (e.g., a UL grant or UE group-common PDCCH) and/or higher-layer signaling (e.g., RRC signaling).

(1) A time period (referred to as a TX window) during which the UE may attempt to transmit the PUCCH (or PUSCH). The time period may include one or more slots.

(2) A maximum number of times the PUCCH (or PUSCH) transmission is attempted within the TX window.

(3) The starting transmission symbol of the PUCCH (or PUSCH) in each Slot within the TX window The starting transmission symbol in each slot may be determined by one or more of the following variables.

An Indicator in DCI (e.g., UL grant)

A (Local) slot index (in the TX window)

The number of attempts to transmit the PUCCH (or PUSCH) (until a corresponding slot) (in the TX window)

In the above configuration, the UE may not attempt an additional transmission after up to one successful PUCCH transmission within the TX window.

More specifically, the BS may indicate, to the UE, a single slot or a plurality of (successive) slots in which the UE may attempt a PUCCH transmission, by DCI (e.g., UL grant or UE-common DCI). Further, the BS may indicate, to the UE, the indexes and number of groups to which the PUCCH transmission belongs, by the UL grant. In this case, the UE may regard a value obtained by applying a modulo operation based on the number of groups to the (local) slot indexes of the plurality of slots indicated by the BS as a group index having priority in the corresponding slot. Subsequently, the UE attempts a PUCCH transmission in each slot until at least one PUCCH transmission is successful in the plurality of slots. However, if the group index of the UE has no priority in each slot, the UE delays the starting symbol of the PUCCH transmission in the slot by a predetermined time. On the contrary, if the group index of the UE has priority, the UE may perform the PUCCH transmission (starting in the first symbol of the slot) without delaying the starting symbol of the PUCCH in the slot.

Figure 30:
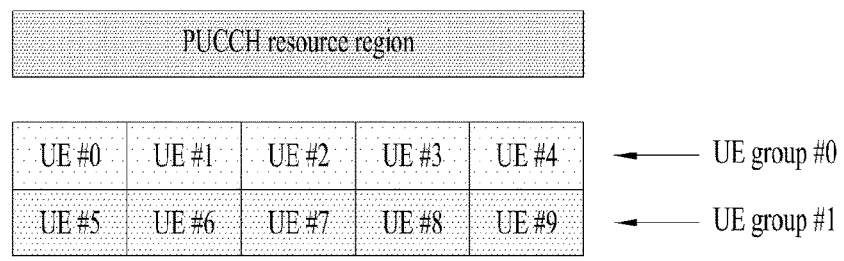
FIG. 30 is a schematic diagram illustrating an operation of transmitting a signal on a UE group basis according to the present disclosure.
Figure 30:
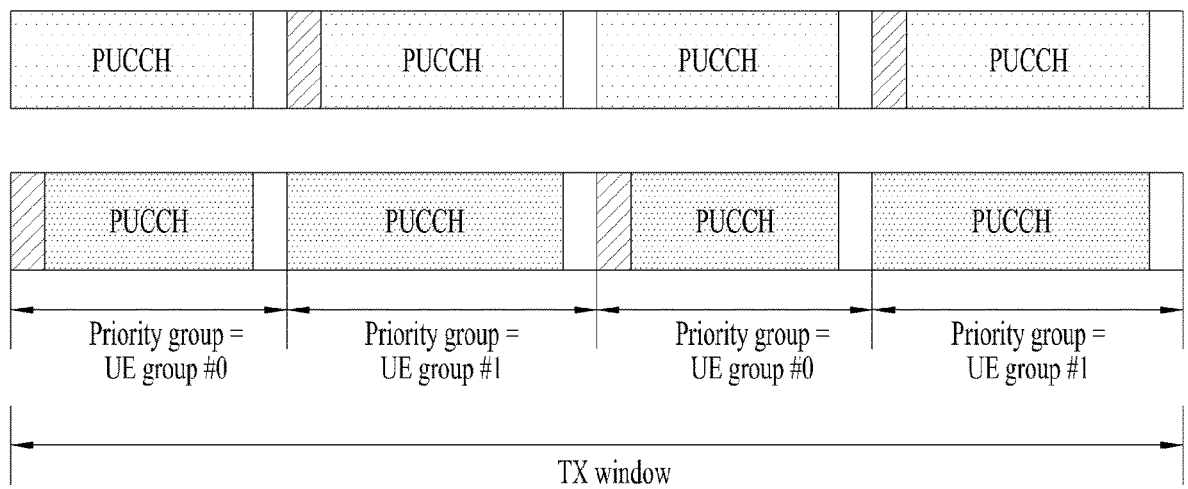

FIG. 30 is a schematic diagram illustrating an operation of performing signal transmission on a UE group basis according to the present disclosure.

In FIG. 30, it is assumed that the number of groups is 2, UE #0/1/2/3/4 is indicated by group index 0, and UE #5/6/7/8/9 is indicated by group index 1. The UEs corresponding to group index 0 in four slots transmit PUCCHs, starting from symbol index 0 in the first and third slots, and PUCCHs, starting from symbol index N (N>0) in the second and fourth slots. The UEs corresponding to group index 1 transmit PUCCHs, starting from symbol index 0 in the second and fourth slots, and PUCCHs, starting from symbol index N (N>0) in the first and third slots.

By this configuration, slots within the TX window may be distributed uniformly to a plurality of UE groups, and in the slots allocated to each UE group, PUCCH transmissions of the UEs in the UE group may have priority. That is, through the above configuration, the TX window may be fairly distributed between UE groups (not FDMed/CDMed) based on priority.

Unless conflicting with each other, the above operation may be performed with the foregoing other operations of the present disclosure.

3.2.4 UCI Piggyback Scheme Based on CAP Result

If the UE fails to transmit a PUCCH resource configured and/or indicated by the BS due to a CAP-caused channel access delay, the UE may transmit UCI (corresponding to the PUCCH resource) in one or more of the following methods.

(1) Opt. 1

Method of transmitting the UCI corresponding to the PUCCH resource in (partial) PUSCH resource(s) (in which channel access is successful) in a UL TX burst scheduled to include the (missing) PUCCH resource (e.g., UCI piggyback). For example, the UE may transmit the UCI corresponding to the PUCCH resource in the last PUSCH resource (in which channel access is successful) in the UL TX burst.

(2) Opt. 2

Method of puncturing or rate-matching (some) (OFDM) symbol(s) in (some) PUSCH resource(s) (in which channel access is successful) in a UL TX burst scheduled to include the (missing) PUCCH resources, and then transmitting the PUCCH resources in the (OFDM) symbol(s). For example, the UE may puncture or rate-match (partial) (OFDM) symbol(s) in the last PUSCH resource (in which channel access is successful) in the UL TX burst and then transmit the PUCCH resource in the (OFDM) symbol(s).

(3) Opt. 3

Method of successively transmitting after (some) PUSCH resource(s) (in which channel access is successful) in a UL TX burst scheduled to include the (missing) PUCCH resource. For example, the UE may transmit the PUCCH resource in succession after the last PUSCH resource (in which channel access is successful) in the UL TX burst.

In the above configurations, the UL TX burst may refer to a series of UL signals continuous on the time axis.

The above-described operation according to Opt. 1 may be applied only when a UE processing time enough for the UE to transmit UCI of a (missing) PUCCH on a PUSCH is ensured. If the UE processing time enough for the UE to transmit the UCI of the (missing) PUCCH on the PUSCH is not ensured (or the UE processing time is insufficient), the UE may skip the UCI transmission or perform the operation of Opt. 2 or Opt. 3.

Figure 31:
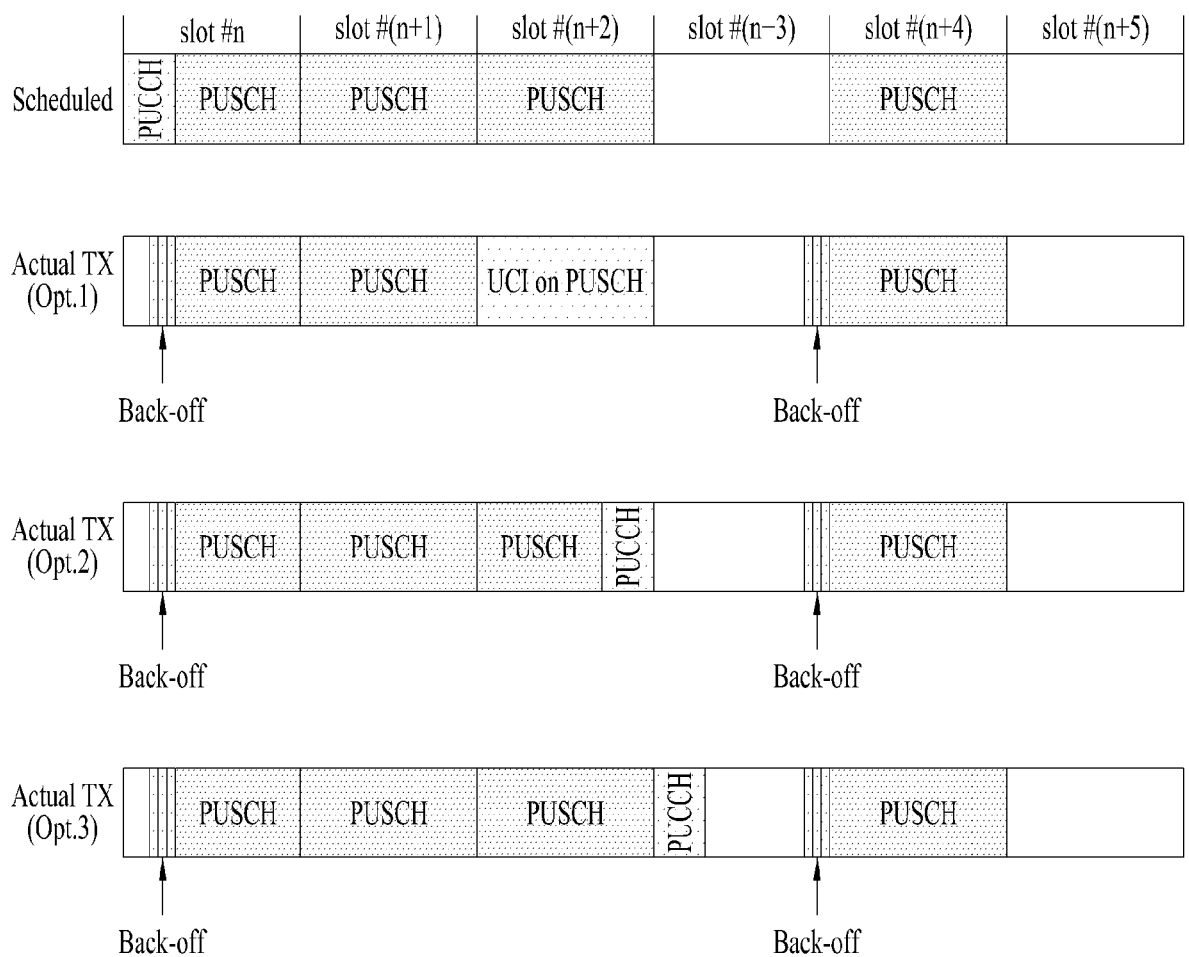
FIG. 31 is a schematic diagram illustrating a UCI piggyback operation of a UE according to the present disclosure.

FIG. 31 is a schematic diagram illustrating a UCI piggyback operation of a UE according to the present disclosure.

As illustrated in FIG. 31, it is assumed that a BS has scheduled a PUCCH and a PUSCH for a UE (labeled with scheduled in FIG. 31). In this case, when the UE fails to access a channel in a CAP operation before transmitting a signal of a PUCCH resource, the UE may drop the PUCCH transmission, thus omitting UCI reporting.

Accordingly, the present disclosure proposes a method for transmitting UCI corresponding to a missing PUCCH in scheduled PUSCH resource(s) after the PUCCH, without any additional instruction from a BS.

As in Opt. 1 in FIG. 31, for example, the UE may perform UCI piggyback to the (last) PUSCH resource in which channel access is successful among the scheduled PUSCH resource(s) after the PUCCH resource (Opt. 1 of FIG. 31).

In another example, as in Opt. 2 in FIG. 31, the UE may puncture/rate-match some (OFDM) symbols of the (last) PUCCH resource in which channel access is successful among the scheduled PUSCH resource(s) after the PUCCH resource and transmit the missing PUCCH resource in the corresponding PUSCH resource (Opt. 2 in FIG. 31).

In another example, as in Opt. 3 in FIG. 31, the UE may successively transmit the missing PUCCH resource after the (last) PUCCH resource in which channel access is successful among the PUSCH resource(s) scheduled after the PUCCH resource (Opt. 3 in FIG. 31).

Unless conflicting with each other, the above operation may be performed in combination with the foregoing other operations of the present disclosure.

3.3 Example Applicable to the Present Disclosure

Figure 32:
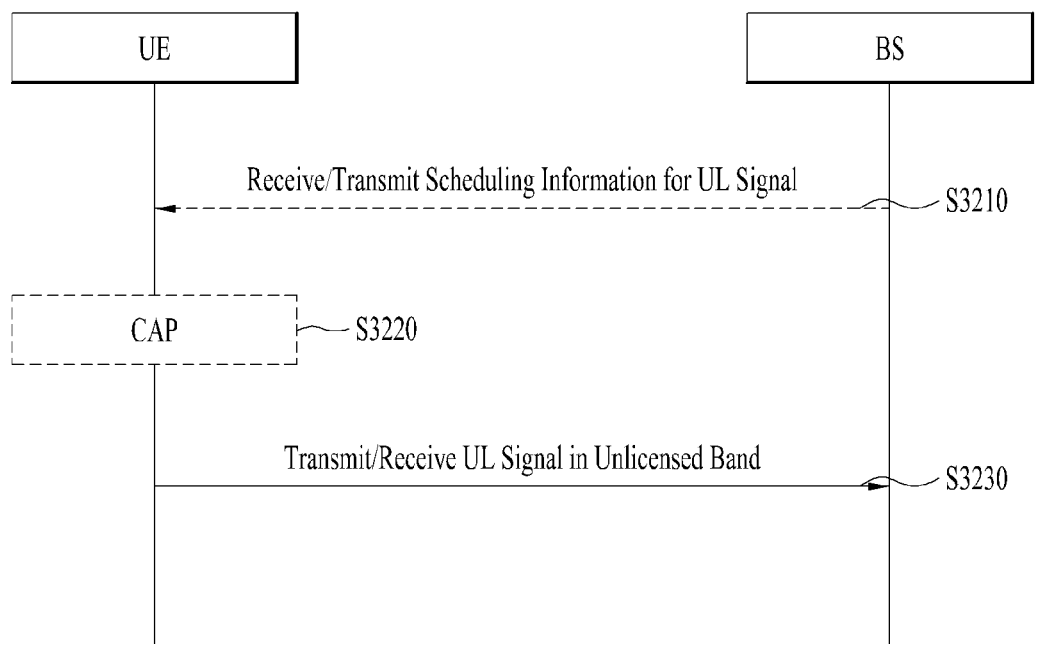
FIG. 32 is a diagram illustrating a signal flow for a method of transmitting and receiving signals between a UE and a base station (BS)
Figure 33:
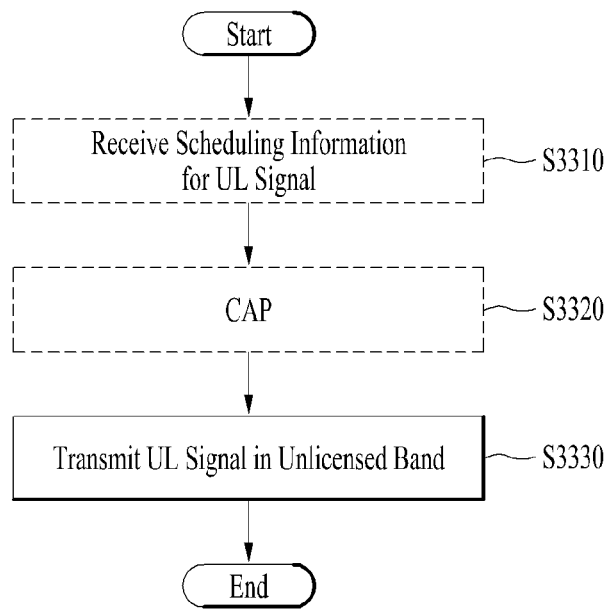
FIG. 33 is a flowchart illustrating an operation of a UE according to an example of the present disclosure.
Figure 34:
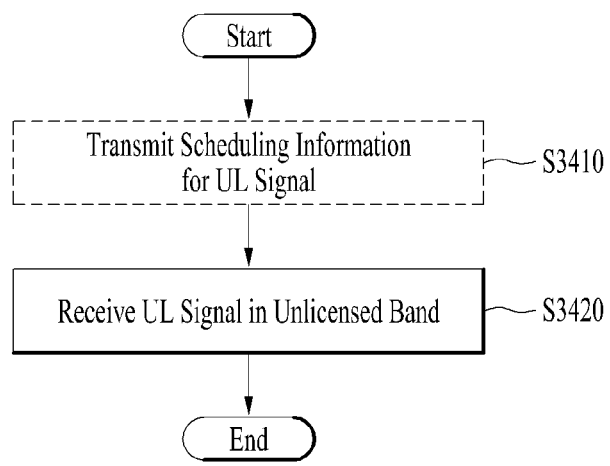
FIG. 34 is a flowchart illustrating an operation of a BS according to an example of the present disclosure.

FIG. 32 is a diagram illustrating a method of transmitting and receiving a signal between a UE and a BS according to an example of the present disclosure, FIG. 33 is a flowchart illustrating an operation of a UE according to an example of the present disclosure, and FIG. 34 is a flowchart illustrating an operation of a BS according to an example of the present disclosure.

In the present disclosure, a BS may transmit, to a UE, scheduling information for transmission of a UL signal in an unlicensed band (S3210 and S3410). In response, the UE may receive the scheduling information from the BS (S3210 and S3310). The scheduling information may be transmitted in a licensed band or unlicensed band.

The scheduling information may indicate at least one of a plurality of interlaces for transmission of the UL signal.

One of the plurality of interlaces may include N RBs with the same RB interval between adjacent RBs in a unit of a first frequency bandwidth (e.g., 20 MHz) (refer to FIG. 25). The number M of interlaces included in the unit of the first frequency bandwidth (e.g., 20 MHz) and the number N of RBs included in the one interlace may be determined based on a configured SCS.

The UE may perform a CAP for transmission of the UL signal in the unlicensed band (S3220 and S3320). Subsequently, the UE maps the UL signal to the at least one interlace indicated by the scheduling information, and transmits the UL signal in the at least one interlace in the unlicensed band (S3230). Alternatively, steps S3220 and S3230 may be interpreted as amounting to the UE's transmission of the UL signal in the at least one interlace in the unlicensed band by a CAP.

In response, the BS receives the UL signal in the at least one interlace in the unlicensed band (S3230 and S3420).

If the configured SCS is 15 kHz, M (e.g., the number of interlaces included in the 20-MHz unit) may be determined to be 10, and N (e.g., the number of RBs included in one interlace within the 20-MHz unit) may be determined to be 10 or 11.

If the configured SCS is 30 kHz, M (e.g., the number of interlaces included in the 20-MHz unit) may be determined to be 5, and N (e.g., the number of RBs included in one interlace within the 2-0 MHz unit) may be determined to be 10 or 11.

If the configured SCS is 60 kHz, M and N may be determined to be one of the following combinations.

M=4 & N=6 or M=4 & N=7
M=3 & N=8 or M=4 & N=9
M=2 & N=12 or M=2 & N=13e

In the present disclosure, if a total frequency allocated to the UE is larger than 20 MHz, the plurality of interlaces may be configured as a set of M interlaces configured every 20 MHz. In other words, for carrier(s) having a frequency bandwidth larger than 20 MHz, interlace(s) which are resources for transmission of a UL signal of the UE may be configured/defined based on a 20-MHz subband. In this case, an interlace spacing may be irregularly configured/defined at an edge of each subband.

In the present disclosure, the SCS may be configured by higher-layer signaling.

In the present disclosure, the UL signal may include a PUSCH signal or a PUCCH signal. The PUSCH signal may be transmitted on the PUSCH, and the PUCCH signal may be transmitted on the PUCCH.

The UE may transmit the UL signal in the at least one interlace in the unlicensed band by the CAP.

For example, the UE may transmit the UL signal by puncturing a part of symbols of the UL signal based on the CAP.

Especially, when the PUCCH signal among the UL signal is punctured based on the CAP, the UE may transmit the PUCCH signal in a remaining UL signal (e.g., the PUSCH signal may be included as a UL signal transmitted by the UE).

In another example, the UE may transmit the UL signal after one or more symbols from a scheduled timing of the UL signal, based on the CAP. In other words, when a time at which the UE starts transmitting the UL signal by using the CAP is different from the scheduling time, the UE may transmit the scheduled UL signal with respect to the starting transmission time of the UL signal.

In the present disclosure, the PUCCH signal may be transmitted across one or two symbols or across 4 to 14 symbols based on a configured PUCCH format.

In the present disclosure, the PUCCH signal may include the same UCI in each RB included in the at least one interlace.

Alternatively, the PUCCH signal may include different UCI in each RB included in the at least one interlace.

In the present disclosure, one RB may include 12 subcarriers in the frequency domain.

Since examples of the above-described proposal method may also be included in one of implementation methods of the present invention, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Device Configuration

Figure 35:
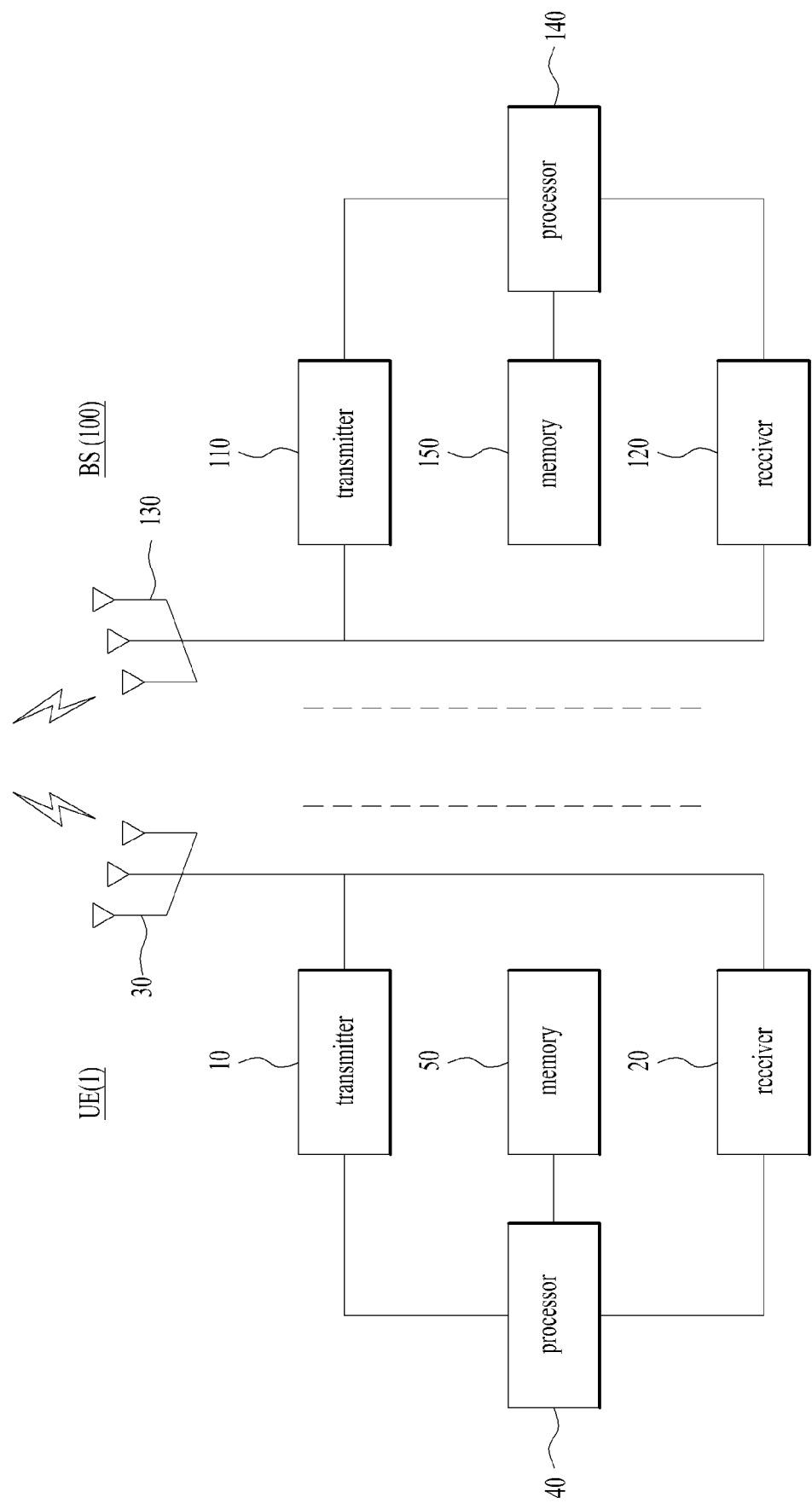
FIG. 35 is a block diagram illustrating the configurations of a UE and a BS for implementing the proposed embodiments

FIG. 35 is a block diagram illustrating the configurations of a UE and a BS for implementing the proposed embodiments. The UE and the BS illustrated in FIG. 35 operate to implement the embodiments of the afore-described method of transmitting and receiving a signal in an unlicensed band.

A UE 1 may act as a transmission end on a UL and as a reception end on a DL. A BS (BS or BS) 100 may act as a reception end on a UL and as a transmission end on a DL.

That is, each of the UE and the BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Further, each of the UE and the BS includes a processor 40 or 140 for implementing the afore-described embodiments of the present disclosure. The processor 40 or 140 may be configured to perform the foregoing described/proposed procedures and/or methods by controlling the memory 50 or 150 and/or the Tx 10 or 110 and/or the Rx 20 or 120.

For example, the processor 40 or 140 includes a communication modem designed to implement wireless communication technologies (e.g., LTE and NR). The memory 50 or 150 is coupled to the processor 40 or 140, and stores various types of information related to operations of the processor 40 or 140. For example, the memory 50 or 150 may store software code including instructions for performing all or part of processes controlled by the processor 40 or 140 or the afore-described/proposed procedures and/or methods. The Tx 10 or 110 and/or the Rx 20 or 120 is coupled to the processor 40 or 140 and transmits and/or receives a wireless signal. The processor 40 or 140 and the memory 50 or 150 may be part of a processing chip (e.g., system on chip (SoC)).

A processor of a communication device which transmits or receives a UL signal in an unlicensed band according to the present disclosure may operate as follows by controlling a memory.

The processor included in the communication device that transmits a UL signal is coupled to the memory, and configured to map the UL signal to at least one of a plurality of interlaces and transmit the UL signal in the at least one interlace in the unlicensed band. The processor included in a communication device that receives a UL signal is coupled to the memory and configured to receive the UL signal in at least one of a plurality of interlaces in the unlicensed band.

One of the plurality of interlaces may include N RBs with the same RB interval between neighboring RBs within a first frequency bandwidth unit. The number M of interlaces included in the first frequency bandwidth unit and the number N of RBs included in the one interlace may be determined based on a configured SCS. M and N may be natural numbers.

The Tx and Rx of the UE and the BS may perform a packet modulation/demodulation function for data transmission, a high-speed packet channel coding function, OFDM packet scheduling, TDD packet scheduling, and/or channelization. Each of the UE and the BS of FIG. 35 may further include a low-power radio frequency (RF)/intermediate frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting an uplink signal by a user equipment (UE) in a wireless communication system supporting an unlicensed band, the method comprising:
   mapping the uplink signal to at least one interlace among a plurality of interlaces, wherein one interlace among the plurality of interlaces is composed of a plurality of resource blocks (RBs) having an identical RB interval between adjacent RBs in a unit of a first frequency bandwidth,
   wherein, based on a configured subcarrier spacing, a number of RBs included in at least one first interlace and a number of RBs included in at least one second interlace are differently configured, the at least one first interlace and the at least one second interlace being included in a number M of interlaces included in the unit of the first frequency bandwidth,
   wherein, based on the configured subcarrier spacing being 15 kHz, M is configured as 10, the at least one first interlace is configured to include 10 RBs, and the at least one second interlace is configured to include 11 RBs; and
   transmitting the uplink signal via the at least one interlace in the unlicensed band.

2. The method according to claim 1, wherein, based on the configured subcarrier spacing being 30 kHz, M is configured as 5, the at least one first interlace is configured to include 10 RBs, and the at least one second interlace is configured to include 11 RBs.

3. The method according to claim 1, wherein the unit of the first frequency bandwidth is 20 MHz.

4. The method according to claim 1, wherein, based on a full frequency band allotted to the user equipment being larger than the first frequency bandwidth, the plurality of interlaces are configured as a set of M interlaces configured in a unit of the first frequency bandwidth.

5. The method according to claim 1, wherein the subcarrier spacing is configured by higher-layer signaling.

6. The method according to claim 1, wherein the uplink signal includes a physical uplink shared channel (PUSCH) signal or a physical uplink control channel (PUCCH) signal.

7. The method according to claim 6, wherein the UE transmits the uplink signal in the at least one interlace in the unlicensed band by using a channel access procedure (CAP).

8. The method according to claim 7, wherein the uplink signal is transmitted by puncturing one or more symbols of the uplink signal based on the CAP.

9. The method according to claim 8, wherein when the PUCCH signal out of the uplink signal is punctured based on the CAP, the PUCCH signal is transmitted in a remaining uplink signal.

10. The method according to claim 7, wherein the uplink signal is transmitted after one or more symbols from a scheduled timing.

11. The method according to claim 6, wherein the PUCCH signal is transmitted across 1 or 2 symbols or across 4 to 14 symbols, based on a configured PUCCH format.

12. The method according to claim 6, wherein the PUCCH signal is transmitted including the same uplink control information (UCI) in each RB included in the at least one interlace.

13. The method according to claim 6, wherein the PUCCH signal is transmitted including different UCI in each RB included in the at least one interlace.

14. The method according to claim 1, wherein one RB includes 12 subcarriers in a frequency domain.

15. A communication device for transmitting an uplink signal to a base station (BS) in a wireless communication system supporting an unlicensed band, the communication device comprising:
a memory; and
a processor operatively coupled to the memory,
wherein the processor is configured to:
map the uplink signal to at least one interlace among a plurality of interlaces,
wherein one interlace among the plurality of interlaces is composed of a plurality of resource blocks (RBs) having an identical RB interval between adjacent RBs in a unit of a first frequency bandwidth,
wherein, based on a configured subcarrier spacing, a number of RBs included in at least one first interlace and a number of RBs included in at least one second interlace are differently configured, the at least one first interlace and the at least one second interlace being included in a number M of interlaces included in the unit of the first frequency bandwidth,
wherein based on the configured subcarrier spacing being 15 kHz, M is configured as 10, the at least one first interlace is configured to include 10 RBs, and the at least one second interlace is configured to include 11 RBs; and
transmit the uplink signal via the at least one interlace in the unlicensed band.

16. A communication device for receiving an uplink signal from a user equipment (UE) in a wireless communication system supporting an unlicensed band, the communication device comprising:
a memory; and
a processor operatively coupled to the memory,
wherein the processor is configured to receive the uplink signal in at least one interlace among a plurality of interlaces, wherein one interlace among the plurality of interlaces is composed of a plurality of resource blocks (RBs) having an identical RB interval between adjacent RBs in a unit of a first frequency bandwidth,
wherein, based on a configured subcarrier spacing, a number of RBs included in at least one first interlace and a number of RBs included in at least one second interlace are differently configured, the at least one first interlace and the at least one second interlace being included in a number M of interlaces included in the unit of the first frequency bandwidth,
wherein, based on the configured subcarrier spacing being 15 kHz, M is configured as 10, the at least one first interlace is configured to include 10 RBs, and the at least one second interlace is configured to include 11 RBs.

17. The communication device of claim 15, wherein the communication device communicates with at least one of a mobile terminal, a network and an autonomous vehicle.

* * * * *